United States Patent
Esenlik et al.

(10) Patent No.: US 12,526,444 B2
(45) Date of Patent: *Jan. 13, 2026

(54) LIMITED MEMORY ACCESS WINDOW FOR MOTION VECTOR REFINEMENT

(71) Applicant: HUAWEI TECHNOLOGIES CO., LTD., Shenzhen (CN)

(72) Inventors: Semih Esenlik, Munich (DE); Anand Meher Kotra, Munich (DE); Zhijie Zhao, Shenzhen (CN); Han Gao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 13 days.

This patent is subject to a terminal disclaimer.

(21) Appl. No.: 18/777,829

(22) Filed: Jul. 19, 2024

(65) Prior Publication Data

US 2025/0016354 A1    Jan. 9, 2025

Related U.S. Application Data

(63) Continuation of application No. 18/472,049, filed on Sep. 21, 2023, now Pat. No. 12,069,291, which is a (Continued)

(30) Foreign Application Priority Data

Oct. 9, 2017    (WO) ................. PCT/EP2017/075710

(51) Int. Cl.
*H04N 19/513*    (2014.01)
*H04N 19/57*    (2014.01)

(52) U.S. Cl.
CPC ........... *H04N 19/513* (2014.11); *H04N 19/57* (2014.11)

(58) Field of Classification Search
CPC .... H04N 19/513; H04N 19/52; H04N 19/533; H04N 19/56; H04N 19/57; H04N 19/573
See application file for complete search history.

(56) References Cited

U.S. PATENT DOCUMENTS

| 5,400,087 A | 3/1995 | Uramoto et al. |
| 2011/0293012 A1 | 12/2011 | Au et al. |

(Continued)

FOREIGN PATENT DOCUMENTS

| CN | 105939475 A | 9/2016 |
| RU | 2559839 C1 | 8/2015 |

(Continued)

OTHER PUBLICATIONS

Jianle Chen et al. Algorithm Description of Joint Exploration Test Model 7 (JEM 7), Joint Video Exploration Team (JVET) of ITU-T SG 16 WP 3 and ISO/IEC JTC 1/SC 29/WG 11, JVET-G1001-v1, 7th Meeting: Torino, IT, Jul. 13-21, 2017, total 48 pages, XP030150980.

(Continued)

*Primary Examiner* — Kathleen V Nguyen
(74) *Attorney, Agent, or Firm* — Leydig, Voit & Mayer, Ltd.

(57) ABSTRACT

The present disclosure relates to motion vector refinement. As a first step, an initial motion vector and a template for the block are obtained. Then, the refinement of the initial motion vector is determined by template matching with said template in a search space. The search space is located on a position given by the initial motion vector and includes one or more fractional sample positions, wherein each of the fractional sample positions belonging to the search space is obtained by interpolation filtering with a filter of a predefined tap-size assessing integer samples only within a window, said window being formed by integer samples accessible for the template matching in said search space.

18 Claims, 15 Drawing Sheets

Related U.S. Application Data continuation of application No. 18/158,313, filed on Jan. 23, 2023, now Pat. No. 11,805,270, which is a continuation of application No. 17/849,405, filed on Jun. 24, 2022, now Pat. No. 11,582,477, which is a continuation of application No. 16/843,662, filed on Apr. 8, 2020, now Pat. No. 11,405,632, which is a continuation of application No. PCT/EP2018/064247, filed on May 30, 2018.

(56) References Cited

U.S. PATENT DOCUMENTS

| | | | |
|---|---|---|---|
| 2014/0146890 A1 | | 5/2014 | Chiu et al. |
| 2016/0286230 A1* | | 9/2016 | Li .................... H04N 19/44 |

FOREIGN PATENT DOCUMENTS

| | | |
|---|---|---|
| TW | 201125369 A | 7/2011 |
| WO | 2012125178 A1 | 9/2012 |
| WO | 2017036414 A1 | 3/2017 |
| WO | 2018097693 A2 | 5/2018 |

OTHER PUBLICATIONS

Yi-Jen Chiu et al., "TE1: Fast techniques to improve self derivation of motion estimation", (Joint Collaborativeteam on Video Coding of ISO/IEC JTC1/SC29/WG11 and ITU-T SG.16 ); No. JCTVC-B047, Jul. 28, 2010 (Jul. 28, 2010), XP030007627, total 10 pages.

Chiu Yi-Jen et al, "Decoder-side Motion Estimation and Wiener filter for HEVC", 2013 Visual Communications and Image Processing (VCIP), IEEE, Nov. 17, 2013 (Nov. 17, 2013), p. 1-6, XP032543658.

Steffen Kamp et al, "Decoder-Side Motion Vector Derivation for Block-Based Video Coding", IEEE Transactions on Circuits and Systems for Video Technology, Institute of Electrical and Electronics Engineers, USA, vol. 22, No. 12, Dec. 1, 2012 (Dec. 1, 2012), p. 1732-1745, XP011487149.

Ming Li et al, "Rate-Distortion Criterion Based Picture Padding for Arbitrary Resolution Video Coding Using H.264/MPEG-4 AVC", IEEE Transactions on Circuits and Systems for Video Technology, Institute of Electrical and Electronics Engineers, USA, vol. 20, No. 9, Sep. 1, 2010 (Sep. 1, 2010), p. 1233-1241, XP011315559.

V. Sze et. al., Section 5.3 Fractional Sample Interpolation of High Efficiency Video Coding (HEVC) book by Springer, 2014. pp. 129-137.

Xu Chen et al. Decoder-Side Motion Vector Refinement Based on Bilateral Template Matching, JVET-D0029, 4th Meeting: Chengdu, CN, Oct. 15-21, 2016. total 4 pages.

Jianle Chen et al. Algorithm Description of Joint Exploration Test Model 1, Joint Video Exploration Team (JVET) of ITU-T SG 16 WP 3 and ISO/IEC JTC 1/SC 29/WG 11, JVET-A1001, 1nd Meeting: Geneva, CH, Oct. 19-21, 2015. total 27 pages.

ITU-T H.264 Telecommunication Standardization Sector of ITU (Apr. 2017), Series H: Audiovisual and Multimedia Systems, Infrastructure of audiovisual services—Coding of moving video, Advanced video coding for generic audiovisual services, Apr. 2017. total 812 pages.

ITU-T H.265(Dec. 2016), Series H: Audiovisual and Multimedia Systems, Infrastructure of audiovisual services—Coding of moving video, High efficiency video coding, Dec. 2016. total 664 pages.

Xu Chen et al, EE3: Decoder-Side Motion Vector Refinement Based on Bilateral Template Matching, Joint Video Exploration Team (JVET) of ITU-T SG 16 WP 3 and ISO/IEC JTC 1/SC 29/WG 11, JVET-E0052, 4th Meeting: Chengdu, CN, Oct. 15-21, 2016, 5 pages.

Yuan Ji-wei et al., "Effective Memory Reduction Scheme Used for Reference Frames in H.264/AVC Encoder," Total 3 pages (Aug. 2007). With an English abstract.

\* cited by examiner

LIMITED MEMORY ACCESS WINDOW FOR MOTION VECTOR REFINEMENT

CROSS-REFERENCE TO RELATED APPLICATIONS

This application is a continuation of U.S. patent application Ser. No. 18/472,049, filed on Sep. 21, 2023, which is a continuation of U.S. patent application Ser. No. 18/158,313, filed on Jan. 23, 2023, now U.S. Pat. No. 11,805,270, which is a continuation of U.S. patent application Ser. No. 17/849,405, filed on Jun. 24, 2022, now U.S. Pat. No. 11,582,477, which is a continuation of U.S. patent application Ser. No. 16/843,662, filed on Apr. 8, 2020, now U.S. Pat. No. 11,405,632, which is a continuation of International Application No. PCT/EP2018/064247, filed on May 30, 2018, which claims priority to International Patent Application No. PCT/EP2017/075710, filed on Oct. 9, 2017. All of the afore-mentioned patent applications are hereby incorporated by reference in their entireties.

TECHNICAL FIELD

The present disclosure relates to motion vector determination and refinement which may be employed during encoding and decoding of videos.

BACKGROUND

Current hybrid video codecs employ predictive coding. A picture of a video sequence is subdivided into blocks of pixels and these blocks are then coded. Instead of coding a block pixel by pixel, the entire block is predicted using already encoded pixels in the spatial or temporal proximity of the block. The encoder further processes only the differences between the block and its prediction. The further processing typically includes a transformation of the block pixels into coefficients in a transformation domain. The coefficients may then be further compressed by means of quantization and further compacted by entropy coding to form a bitstream. The bitstream further includes any signaling information which enables the decoder to decode the encoded video. For instance, the signaling may include settings concerning the encoder settings such as size of the input picture, frame rate, quantization step indication, prediction applied to the blocks of the pictures, or the like.

Temporal prediction exploits temporal correlation between pictures, also referred to as frames, of a video. The temporal prediction is also called inter-prediction, as it is a prediction using the dependencies between (inter) different video frames. Accordingly, a block being encoded, also referred to as a current block, is predicted from one or more previously encoded picture(s) referred to as a reference picture(s). A reference picture is not necessarily a picture preceding the current picture in which the current block is located in the displaying order of the video sequence. The encoder may encode the pictures in a coding order different from the displaying order. As a prediction of the current block, a co-located block in a reference picture may be determined. The co-located block is a block which is located in the reference picture on the same position as is the current block in the current picture. Such prediction is accurate for motionless picture regions, i.e. picture regions without movement from one picture to another.

In order to obtain a predictor which takes into account the movement, i.e. a motion compensated predictor, motion estimation is typically employed when determining the prediction of the current block. Accordingly, the current block is predicted by a block in the reference picture, which is located in a distance given by a motion vector from the position of the co-located block. In order to enable a decoder to determine the same prediction of the current block, the motion vector may be signaled in the bitstream. In order to further reduce the signaling overhead caused by signaling the motion vector for each of the blocks, the motion vector itself may be estimated. The motion vector estimation may be performed based on the motion vectors of the neighboring blocks in spatial and/or temporal domain.

The prediction of the current block may be computed using one reference picture or by weighting predictions obtained from two or more reference pictures. The reference picture may be an adjacent picture, i.e. a picture immediately preceding and/or the picture immediately following the current picture in the display order since adjacent pictures are most likely to be similar to the current picture. However, in general, the reference picture may be also any other picture preceding or following the current picture in the displaying order and preceding the current picture in the bitstream (decoding order). This may provide advantages for instance in case of occlusions and/or non-linear movement in the video content. The reference picture identification may thus be also signaled in the bitstream.

A special mode of the inter-prediction is a so-called bi-prediction in which two reference pictures are used in generating the prediction of the current block. In particular, two predictions determined in the respective two reference pictures are combined into a prediction signal of the current block. The bi-prediction may result in a more accurate prediction of the current block than the uni-prediction, i.e. prediction only using a single reference picture. The more accurate prediction leads to smaller differences between the pixels of the current block and the prediction (referred to also as "residuals"), which may be encoded more efficiently, i.e. compressed to a shorter bitstream. In general, more than two reference pictures may be used to find respective more than two reference blocks to predict the current block, i.e. a multi-reference inter prediction can be applied. The term multi-reference prediction thus includes bi-prediction as well as predictions using more than two reference pictures.

In order to provide more accurate motion estimation, the resolution of the reference picture may be enhanced by interpolating samples between pixels. Fractional pixel interpolation can be performed by weighted averaging of the closest pixels. In case of half-pixel resolution, for instance a bilinear interpolation is typically used. Other fractional pixels are calculated as an average of the closest pixels weighted by the inverse of the distance between the respective closest pixels to the pixel being predicted.

The motion vector estimation is a computationally complex task in which a similarity is calculated between the current block and the corresponding prediction blocks pointed to by candidate motion vectors in the reference picture. Typically, the search region includes M×M samples of the image and each of the sample position of the M×M candidate positions is tested. The test includes calculation of a similarity measure between the N×N reference block C and a block R, located at the tested candidate position of the search region. For its simplicity, the sum of absolute differences (SAD) is a measure frequently used for this purpose and given by:

$$SAD(x, y) = \sum_{i=0}^{N-1}\sum_{j=0}^{N-1} |R_{i,j}(x, y) - C_{i,j}|$$

In the above formula, x and y define the candidate position within the search region, while indices i and j denote samples within the reference block C and candidate block R. The candidate position is often referred to as block displacement or offset, which reflects the representation of the block matching as shifting of the reference block within the search region and calculating a similarity between the reference block C and the overlapped portion of the search region. In order to reduce the complexity, the number of candidate motion vectors is usually reduced by limiting the candidate motion vectors to a certain search space. The search space may be, for instance, defined by a number and/or positions of pixels surrounding the position in the reference picture corresponding to the position of the current block in the current image. After calculating SAD for all M×M candidate positions x and y, the best matching block R is the block on the position resulting in the lowest SAD, corresponding to the largest similarity with reference block C. On the other hand, the candidate motion vectors may be defined by a list of candidate motion vectors formed by motion vectors of neighboring blocks.

Motion vectors are usually at least partially determined at the encoder side and signaled to the decoder within the coded bitstream. However, the motion vectors may also be derived at the decoder. In such case, the current block is not available at the decoder and cannot be used for calculating the similarity to the blocks to which the candidate motion vectors point in the reference picture. Therefore, instead of the current block, a template is used which is constructed out of pixels of already decoded blocks. For instance, already decoded pixels adjacent to the current block may be used. Such motion estimation provides an advantage of reducing the signaling: the motion vector is derived in the same way at both the encoder and the decoder and thus, no signaling is needed. On the other hand, the accuracy of such motion estimation may be lower.

In order to provide a tradeoff between the accuracy and signaling overhead, the motion vector estimation may be divided into two steps: motion vector derivation and motion vector refinement. For instance, a motion vector derivation may include selection of a motion vector from the list of candidates. Such a selected motion vector may be further refined for instance by a search within a search space. The search in the search space is based on calculating cost function for each candidate motion vector, i.e. for each candidate position of block to which the candidate motion vector points.

Document JVET-D0029: Decoder-Side Motion Vector Refinement Based on Bilateral Template Matching, X. Chen, J. An, J. Zheng (the document can be found at: http://phenix.it-sudparis.eu/jvet/site) shows motion vector refinement in which a first motion vector in integer pixel resolution is found and further refined by a search with a half-pixel resolution in a search space around the first motion vector.

In order to perform motion vector refinement, it is necessary to store at least those samples in the memory, which are necessary for the current block to perform the refinement, i.e. the samples which correspond to the search space and samples which can be accessed when template matching in the search space is performed.

External memory access is an important design parameter in present hardware architectures and/or software implementations. This is caused by the fact that the external memory access slows down the processing in comparison with the intern memory utilization. On the other hand, internal memory on chip is limited, for instance due to the chip size implementation.

SUMMARY

The present disclosure is based on observation that motion vector refinement when implemented in combination with fractional interpolation may require further increase of on-chip memory size or even external memory access. Both options may be undesirable.

In view of the above mentioned problem, the present disclosure provides motion vector prediction which enables to take into account the number of accesses to the external memory and the number of samples which are necessary to be accessible for motion vector refinement of a motion vector for a coding block.

This is achieved by limiting the number of samples to those necessary for the integer sample template matching and only enabling those fractional positions which are obtainable with a predetermined interpolation filter without requiring additional integer samples.

According to an aspect of the disclosure, an apparatus is provided for determination of a motion vector for a prediction block including a processing circuitry configured to: obtain an initial motion vector and a template for the prediction block; and determine a refinement of the initial motion vector by template matching with said template in a search space. Said search space is located on a position given by the initial motion vector and includes one or more fractional sample positions, wherein each of the fractional sample positions belonging to the search space is obtained by interpolation filtering with a filter of a predefined tap-size assessing integer samples only within a window, said window being formed by integer samples accessible for the template matching in said search space.

One of the advantages of such motion vector determination is limited number of samples which need to be accessible for performing the motion vector refinement for a prediction block while at the same time limiting the number of accesses to the external memory or generally to a memory/storage/cache storing the entire reference pictures.

In an example, the window is defined as N integer sample columns and M integer sample rows relative to the prediction block initial motion vector, N and M being non-zero integer values. Such definition may provide a simple means for specifying which samples are to be retrieved for the purpose of motion vector determination and/or refinement. It may also be easily configurable for instance within a bitstream or standard.

In one embodiment, the processing circuitry is configured to determine the refinement of the initial motion vector by template matching with said template in a search space which is iteratively extended in a direction given by one of more best matching positions of the search space in a most recent iteration, and the window is defined by a predefined maximum number of the iterations.

The search space may include a rectangular sub-window of the window such that all integer samples accessed for interpolation filtering of each fractional sample in the sub-window are located within said window for the interpolation filter with the predefined tap-size.

The search space may include a rectangular search sub-window of the window, wherein the refinement of the initial motion vector is determined by template matching with said template in the rectangular search sub-window such that the integer samples accessed for interpolation filtering of each fractional sample in the search sub-window are located within said window for the interpolation filter with the predefined tap-size.

In one implementation, the processing circuitry may be configured to determine the refinement of the initial motion vector by template matching with said template in a search space which is iteratively extended in a direction given by one of more best matching positions of the search space in a most recent iteration, wherein the iteration is ended when at least one sample within the search space of the most recent iteration is outside the search sub-window.

In particular, as a specific example, the interpolation filter is a one-dimensional filter assessing K either horizontal or vertical integer samples when the fractional position is located on a respective horizontal or vertical line of integer samples.

Moreover, for instance, the search space further includes fractional positions located outside the sub-window either:
adjacent on the top or on the bottom of the sub-window and located on the horizontal line of integer samples or
adjacent on the left or on the right hand side of the sub-window and located on the vertical line of integer samples.

According to another aspect of the disclosure, an encoding apparatus is provided for encoding video images split to prediction blocks into a bitstream, the encoding apparatus comprising: the apparatus for determination of a motion vector for a prediction block as described above; and an encoding circuitry for encoding difference between the prediction block and the predictor given by a prediction block in a position based on the determined motion vector and for generating bitstream including the encoded difference and the initial motion vector.

According to another aspect of the disclosure a decoding apparatus is provided for decoding from a bitstream video images split to prediction blocks, the decoding apparatus comprising: a parsing unit for parsing from the bitstream an initial motion vector and an encoded difference between a prediction block and a predictor given by a prediction block in a position specified by a refined motion vector; the apparatus for determination of the refined motion vector for the prediction block as described above; as well as a decoding circuitry for reconstructing the prediction block as a function of the parsed difference and the predictor given by the prediction block in the position specified by the refined motion vector. The function may be or include a sum. The function may further comprise clipping, rounding, scaling or further operations.

According to another aspect of the disclosure a method is provided for determination of a motion vector for a prediction block including the steps of: obtaining an initial motion vector and a template for the prediction block; determining a refinement of the initial motion vector by template matching with said template in a search space, wherein said search space is located on a position given by the initial motion vector and includes one or more fractional sample positions, wherein each of the fractional sample positions belonging to the search space is obtained by interpolation filtering with a filter of a predefined tap-size assessing integer samples only within a window, said window being formed by integer samples accessible for the template matching in said search space.

For instance, the window is defined a as N integer sample columns and M integer sample rows relative to the prediction block initial motion vector, N and M being non-zero integer values.

In an embodiment, the refinement of the initial motion vector is determined by template matching with said template in a search space which is iteratively extended in a direction given by one or more best matching positions of the search space in a most recent iteration, the window is defined by a predefined maximum number of the iterations.

In an exemplary implementation, the search space includes a rectangular sub-window of the window such that all integer samples accessed for interpolation filtering of each fractional sample in the sub-window are located within said window for the interpolation filter with the predefined tap-size.

The search space may include a rectangular search sub-window of the window, wherein the refinement of the initial motion vector is determined by template matching with said template in the rectangular search sub-window such that the integer samples accessed for interpolation filtering of each fractional sample in the search sub-window are located within said window for the interpolation filter with the predefined tap-size.

In one implementation, the refinement of the initial motion vector may be determined by template matching with said template in a search space which is iteratively extended in a direction given by one of more best matching positions of the search space in a most recent iteration, wherein the iteration is ended when at least one sample within the search space of the most recent iteration is outside the search sub-window.

Moreover, for instance, the interpolation filter is a one-dimensional filter assessing K either horizontal or vertical integer samples when the fractional position is located on a respective horizontal or vertical line of integer samples.

Advantageously, the search space further includes fractional positions located outside the sub-window either: adjacent on the top or on the bottom of the sub-window and located on the horizontal line of integer samples or adjacent on the left or on the right hand side of the sub-window and located on the vertical line of integer samples.

According to another aspect of the disclosure an encoding method is provided for encoding video images split to prediction blocks into a bitstream, the encoding method comprising the steps of determining a motion vector for a prediction block according to any of methods described above; as well as encoding difference between the prediction block and the predictor given by a prediction block in a position based on the determined motion vector and for generating bitstream including the encoded difference and the initial motion vector.

According to another aspect of the disclosure a decoding method is provided for decoding from a bitstream video images split to prediction blocks, the decoding method comprising: parsing from the bitstream an initial motion vector and an encoded difference between a prediction block and a predictor given by a prediction block in a position specified by a refined motion vector; determining the refined motion vector for the prediction block according to any of methods mentioned above; and reconstructing the prediction block as a sum of the parsed difference and the predictor given by the prediction block in the position specified by the refined motion vector.

According to an aspect of the disclosure a non-transitory computer-readable storage medium is provided storing instructions which when executed by a processor/processing circuitry perform the steps according to any of the above aspects or embodiments or their combinations.

BRIEF DESCRIPTION OF THE DRAWINGS

In the following exemplary embodiments are described in more detail with reference to the attached figures and drawings, in which.

DETAILED DESCRIPTION

The present disclosure relates to adjustment of the number of samples which are to be accessible to perform motion vector refinement and interpolation in order to obtain fractional positions in a reference picture.

As mentioned above, the external memory access is one of the most important design considerations in today's hardware and software architectures. Motion vector estimation especially when including template matching, for instance in case of motion vector refinement, may also be used with interpolation filtering to obtain fractional positions of the search space. Use of the interpolation filtering may require increase of the number of samples which need to be accessed from the memory. However, this may lead to either increase of the expensive on-chip memory or to increased number of external memory accesses, which on the other hand slows down the implementation. Especially at the decoder side, these problems may lead to more expensive or slower applications which is not desirable.

In order to prevent such situation, the present disclosure provides a restriction on external memory accesses. According to an embodiment of the disclosure, a window of samples which are to be accessible for the motion vector refinement is defined around the position pointed to by a non-refined motion vector, i.e. by the initial motion vector. The window defines the maximum number of samples that need to be accessed from the memory in order to perform the motion vector refinement. In general, the samples which are to be accessible include the samples on positions of the search space in which the template matching is to be performed and the samples which are to be matched with the template for all positions in the search space. The latter typically exceed the search space. For simplicity reasons the window of memory access may be defined as an extension around the coding block (current block for which the motion vector is to be found). For example, R samples from left and right and R samples from top and bottom boundary of the current block may define the window. In other words, when the current block has a size of N×N samples, the access window may have size of (R+N+R)×(R+N+R), i.e. (N+2R)×(N+2R) samples For instance, R may be equal to 4. However, the current block may be of vertical size N different from the horizontal size N and the number of extension samples in top, bottom, left and right direction may also differ.

According to the present disclosure, in order to limit the memory access window, the fractional pixel coordinates are accessed by the motion vector refinement only if samples necessary for the interpolation lie inside the window of memory access for the motion vector refinement as defined for integer samples.

Figure 1:
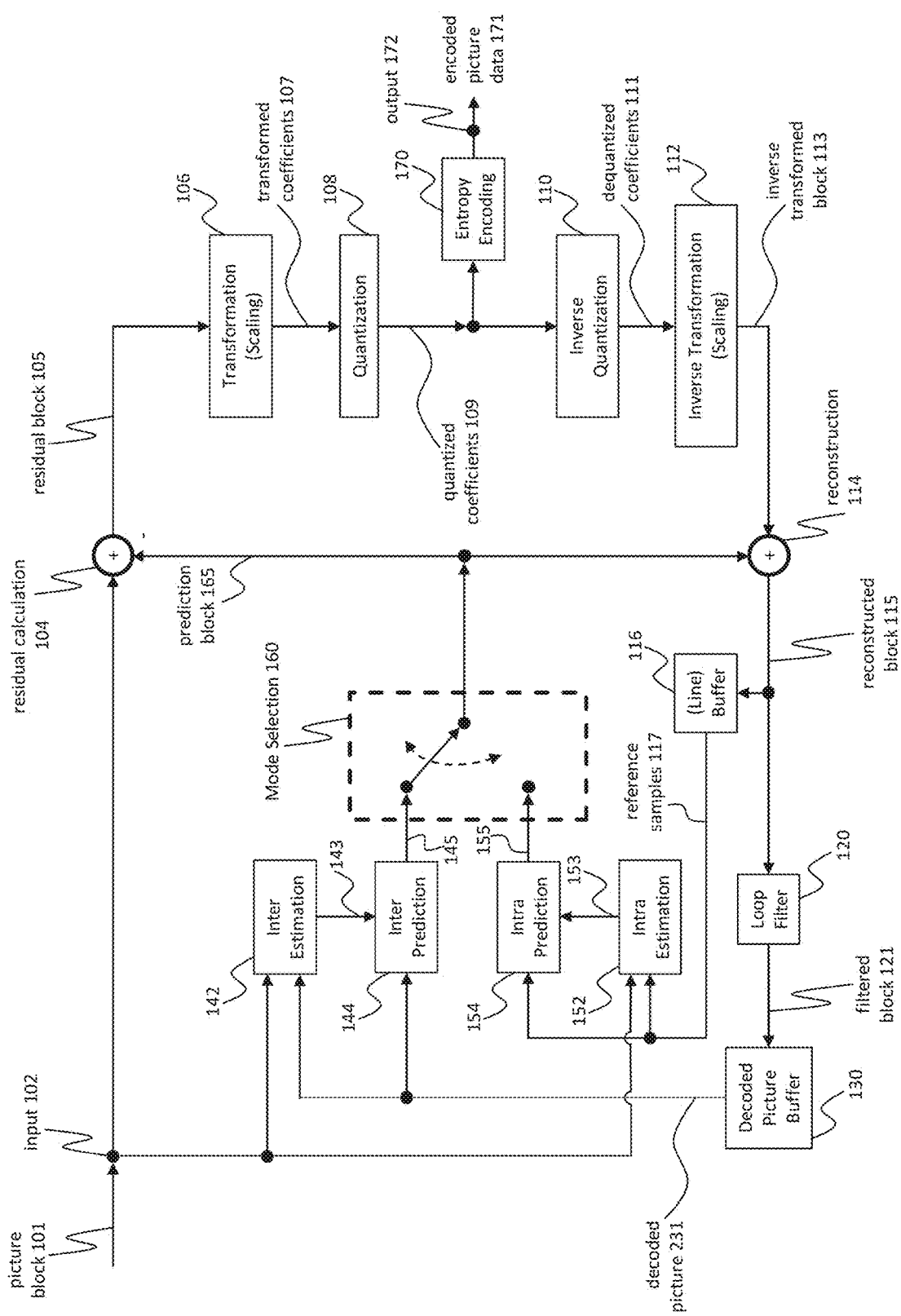
FIG. 1 is a block diagram showing an exemplary structure of an encoder in which the motion vector derivation and refinement may be employed.

FIG. 1 shows an encoder 100 which comprises an input for receiving input image samples of frames or pictures of a video stream and an output for generating an encoded video bitstream. The term "frame" in this disclosure is used as a synonym for picture. However, it is noted that the present disclosure is also applicable to fields in case interlacing is applied. In general, a picture includes m times n pixels. This corresponds to image samples and may comprise one or more color components. For the sake of simplicity, the following description refers to pixels meaning samples of luminance. However, it is noted that the motion vector search of the disclosure can be applied to any color component including chrominance or components of a search space such as RGB or the like. On the other hand, it may be beneficial to only perform motion vector estimation for one component and to apply the determined motion vector to more (or all) components.

The input blocks to be coded do not necessarily have the same size. One picture may include blocks of different sizes and the block raster of different pictures may also differ.

In an explicative realization, the encoder 100 is configured to apply prediction, transformation, quantization, and entropy coding to the video stream. The transformation, quantization, and entropy coding are carried out respectively by a transform unit 106, a quantization unit 108 and an entropy encoding unit 170 so as to generate as an output the encoded video bitstream.

The video stream may include a plurality of frames, wherein each frame is divided into blocks of a certain size that are either intra or inter coded. The blocks of for example the first frame of the video stream are intra coded by means of an intra prediction unit 154. An intra frame is coded using only the information within the same frame, so that it can be independently decoded and it can provide an entry point in the bitstream for random access. Blocks of other frames of the video stream may be inter coded by means of an inter prediction unit 144: information from previously coded frames (reference frames) is used to reduce the temporal redundancy, so that each block of an inter-coded frame is predicted from a block in a reference frame. A mode selection unit 160 is configured to select whether a block of a frame is to be processed by the intra prediction unit 154 or the inter prediction unit 144. This mode selection unit 160 also controls the parameters of intra or inter prediction. In order to enable refreshing of the image information, intra-coded blocks may be provided within inter-coded frames. Moreover, intra-frames which contain only intra-coded blocks may be regularly inserted into the video sequence in order to provide entry points for decoding, i.e. points where the decoder can start decoding without having information from the previously coded frames.

The intra estimation unit 152 and the intra prediction unit 154 are units which perform the intra prediction. In particular, the intra estimation unit 152 may derive the prediction mode based also on the knowledge of the original image while intra prediction unit 154 provides the corresponding predictor, i.e. samples predicted using the selected prediction mode, for the difference coding. For performing spatial or temporal prediction, the coded blocks may be further processed by an inverse quantization unit 110, and an inverse transform unit 112. After reconstruction of the block a loop filtering unit 120 is applied to further improve the quality of the decoded image. The filtered blocks then form the reference frames that are then stored in a decoded picture buffer 130. Such decoding loop (decoder) at the encoder side provides the advantage of producing reference frames which are the same as the reference pictures reconstructed at the decoder side. Accordingly, the encoder and decoder side operate in a corresponding manner. The term "reconstruction" here refers to obtaining the reconstructed block by adding to the decoded residual block the prediction block.

The inter estimation unit 142 receives as an input a block of a current frame or picture to be inter coded and one or several reference frames from the decoded picture buffer 130. Motion estimation is performed by the inter estimation unit 142 whereas motion compensation is applied by the inter prediction unit 144. The motion estimation is used to obtain a motion vector and a reference frame based on certain cost function, for instance using also the original image to be coded. For example, the motion estimation unit 142 may provide initial motion vector estimation. The initial motion vector may then be signaled within the bitstream in form of the vector directly or as an index referring to a motion vector candidate within a list of candidates constructed based on a predetermined rule in the same way at the encoder and the decoder. The motion compensation then derives a predictor of the current block as a translation of a block co-located with the current block in the reference frame to the reference block in the reference frame, i.e. by a motion vector. The inter prediction unit 144 outputs the prediction block for the current block, wherein said prediction block minimizes the cost function. For instance, the cost function may be a difference between the current block to be coded and its prediction block, i.e. the cost function minimizes the residual block. The minimization of the residual block is based e.g. on calculating a sum of absolute differences (SAD) between all pixels (samples) of the current block and the candidate block in the candidate reference picture. However, in general, any other similarity metric may be employed, such as mean square error (MSE) or structural similarity metric (SSIM).

However, cost-function may also be the number of bits necessary to code such inter-block and/or distortion resulting from such coding. Thus, the rate-distortion optimization procedure may be used to decide on the motion vector selection and/or in general on the encoding parameters such as whether to use inter or intra prediction for a block and with which settings.

The intra estimation unit 152 and intra prediction unit 154 receive as an input a block of a current frame or picture to be intra coded and one or several reference samples from an already reconstructed area of the current frame. The intra prediction then describes pixels of a current block of the current frame in terms of a function of reference samples of the current frame. The intra prediction unit 154 outputs a prediction block for the current block, wherein said prediction block advantageously minimizes the difference between the current block to be coded and its prediction block, i.e., it minimizes the residual block. The minimization of the residual block can be based e.g. on a rate-distortion optimization procedure. In particular, the prediction block is obtained as a directional interpolation of the reference samples. The direction may be determined by the rate-distortion optimization and/or by calculating a similarity measure as mentioned above in connection with inter-prediction.

The inter estimation unit 142 receives as an input a block or a more universal-formed image sample of a current frame or picture to be inter coded and two or more already decoded pictures 231. The inter prediction then describes a current image sample of the current frame in terms of motion vectors to reference image samples of the reference pictures. The inter prediction unit 142 outputs one or more motion vectors for the current image sample, wherein said reference image samples pointed to by the motion vectors advantageously minimize the difference between the current image sample to be coded and its reference image samples, i.e., it minimizes the residual image sample. The predictor for the current block is then provided by the inter prediction unit 144 for the difference coding.

The difference between the current block and its prediction, i.e. the residual block 105, is then transformed by the transform unit 106. The transform coefficients 107 are quantized by the quantization unit 108 and entropy coded by the entropy encoding unit 170. The thus generated encoded picture data 171, i.e. encoded video bitstream, comprises intra coded blocks and inter coded blocks and the corresponding signaling (such as the mode indication, indication of the motion vector, and/or intra-prediction direction). The transform unit 106 may apply a linear transformation such as a Fourier or Discrete Cosine Transformation (DFT/FFT or DCT). Such transformation into the spatial frequency domain provides the advantage that the resulting coefficients 107 have typically higher values in the lower frequencies. Thus, after an effective coefficient scanning (such as zig-zag), and quantization, the resulting sequence of values has typically some larger values at the beginning and ends with a run of zeros. This enables further efficient coding. Quantization unit 108 performs the actual lossy compression by reducing the resolution of the coefficient values. The entropy coding unit 170 then assigns to coefficient values binary codewords to produce a bitstream. The entropy coding unit 170 also codes the signaling information (not shown in FIG. 1).

Figure 2:
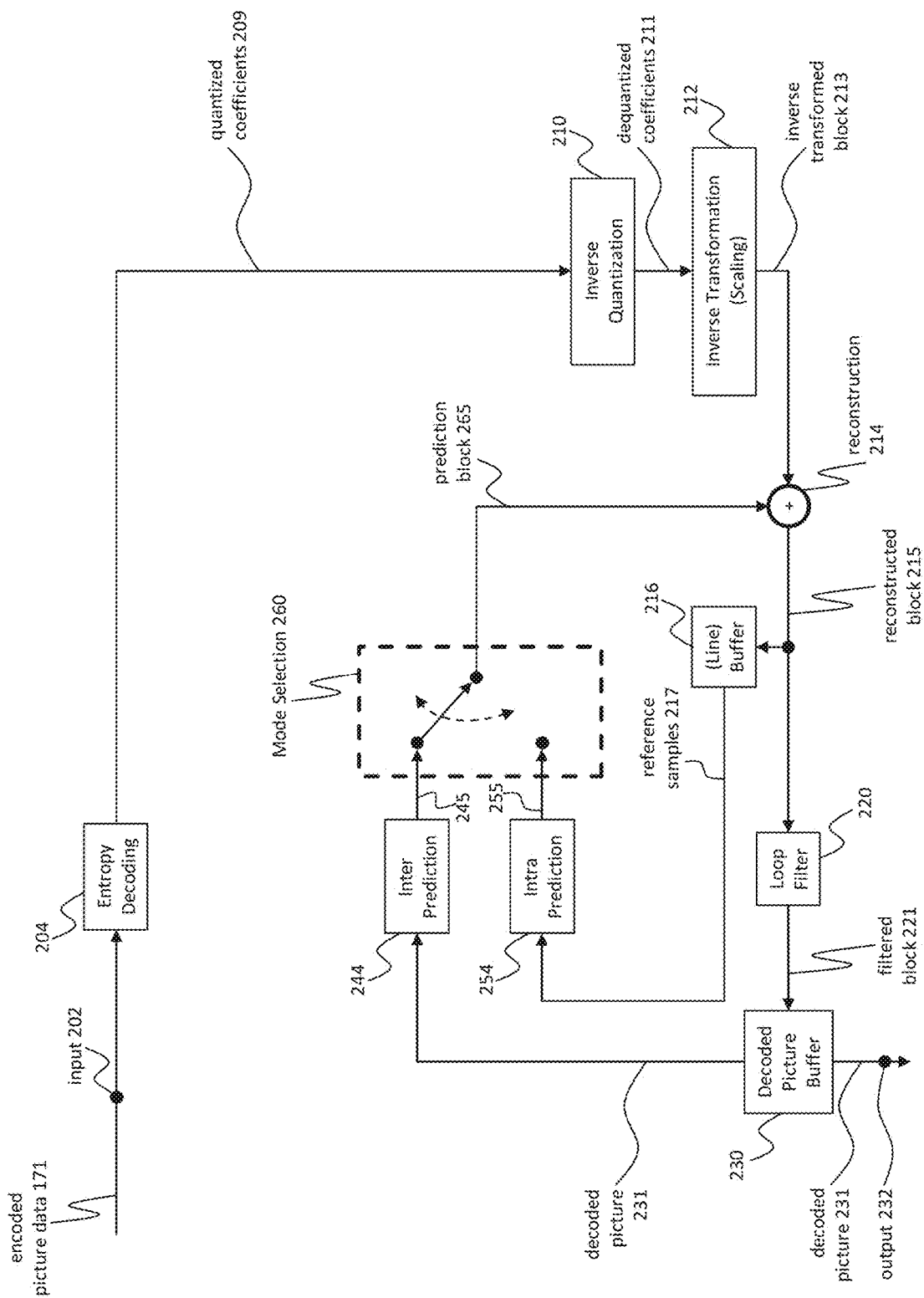
FIG. 2 is a block diagram showing an exemplary structure of a decoder in which the motion vector derivation and refinement may be employed.

FIG. 2 shows a video decoder 200. The video decoder 200 comprises particularly a decoded picture buffer 230, an inter prediction unit 244 and an intra prediction unit 254, which is a block prediction unit. The decoded picture buffer 230 is configured to store at least one (for uni-prediction) or at least two (for bi-prediction) reference frames reconstructed from the encoded video bitstream, said reference frames being different from a current frame (currently decoded frame) of the encoded video bitstream. The intra prediction unit 254 is configured to generate a prediction block, which is an estimate of the block to be decoded. The intra prediction unit 254 is configured to generate this prediction based on reference samples that are obtained from the reconstructed block 215 or buffer 216.

The decoder 200 is configured to decode the encoded video bitstream generated by the video encoder 100, and preferably both the decoder 200 and the encoder 100 generate identical predictions for the respective block to be encoded/decoded. The features of the decoded picture buffer 230, reconstructed block 215, buffer 216 and the intra prediction unit 254 are similar to the features of the decoded picture buffer 130, reconstructed block 115, buffer 116 and the intra prediction unit 154 of FIG. 1.

The video decoder 200 comprises further units that are also present in the video encoder 100 like e.g. an inverse quantization unit 210, an inverse transform unit 212, and a loop filtering unit 220, which respectively correspond to the inverse quantization unit 110, the inverse transform unit 112, and the loop filtering unit 120 of the video coder 100.

An entropy decoding unit 204 is configured to decode the received encoded video bitstream and to correspondingly obtain quantized residual transform coefficients 209 and signaling information. The quantized residual transform coefficients 209 are fed to the inverse quantization unit 210 and an inverse transform unit 212 to generate a residual block. The residual block is added to a prediction block 265 and the addition is fed to the loop filtering unit 220 to obtain the decoded video. Frames of the decoded video can be stored in the decoded picture buffer 230) and serve as a decoded picture 231 for inter prediction.

Generally, the intra prediction units 154 and 254 of FIGS. 1 and 2 can use reference samples from an already encoded area to generate prediction signals for blocks that need to be encoded or need to be decoded.

The entropy decoding unit 204 receives as its input the encoded bitstream 171. In general, the bitstream is at first parsed, i.e. the signaling parameters and the residuals are extracted from the bitstream. Typically, the syntax and semantic of the bitstream is defined by a standard so that the encoders and decoders may work in an interoperable manner. As described in the above Background section, the encoded bitstream does not only include the prediction residuals. In case of motion compensated prediction, a motion vector indication is also coded in the bitstream and parsed therefrom at the decoder. The motion vector indication may be given by means of a reference picture in which the motion vector is provided and by means of the motion vector coordinates. So far, coding the complete motion vectors was considered. However, also only the difference between the current motion vector and the previous motion vector in the bitstream may be encoded. This approach allows exploiting the redundancy between motion vectors of neighboring blocks.

In order to efficiently code the reference picture, H.265 codec (ITU-T, H265, Series H: Audiovisual and multimedia systems: High Efficient Video Coding) provides a list of reference pictures assigning to list indices respective reference frames. The reference frame is then signaled in the bitstream by including therein the corresponding assigned list index. Such list may be defined in the standard or signaled at the beginning of the video or a set of a number of frames. It is noted that in H.265 there are two lists of reference pictures defined, called L0 and L1. The reference picture is then signaled in the bitstream by indicating the list (L0 or L1) and indicating an index in that list associated with the desired reference picture. Providing two or more lists may have advantages for better compression. For instance, L0 may be used for both uni-directionally inter-predicted slices and bi-directionally inter-predicted slices while L1 may only be used for bi-directionally inter-predicted slices. However, in general the present disclosure is not limited to any content of the L0 and L1 lists.

The lists L0 and L1 may be defined in the standard and fixed. However, more flexibility in coding/decoding may be achieved by signaling them at the beginning of the video sequence. Accordingly, the encoder may configure the lists L0 and L1 with particular reference pictures ordered according to the index. The L0 and L1 lists may have the same fixed size. There may be more than two lists in general. The motion vector may be signaled directly by the coordinates in the reference picture. Alternatively, as also specified in H.265, a list of candidate motion vectors may be constructed and an index associated in the list with the particular motion vector can be transmitted.

Motion vectors of the current block are usually correlated with the motion vectors of neighboring blocks in the current picture or in the earlier coded pictures. This is because neighboring blocks are likely to correspond to the same moving object with similar motion and the motion of the object is not likely to change abruptly over time. Consequently, using the motion vectors in neighboring blocks as predictors reduces the size of the signaled motion vector difference. The Motion Vector Predictors (MVPs) are usually derived from already encoded/decoded motion vectors from spatial neighboring blocks or from temporally neighboring or co-located blocks in the reference picture. In H.264/AVC, this is done by doing a component wise median of three spatially neighboring motion vectors. Using this approach, no signaling of the predictor is required. Temporal MVPs from a co-located block in the reference picture are only considered in the so called temporal direct mode of H.264/AVC. The H.264/AVC direct modes are also used to derive other motion data than the motion vectors. Hence, they relate more to the block merging concept in HEVC. In HEVC, the approach of implicitly deriving the MVP was replaced by a technique known as motion vector competition, which explicitly signals which MVP from a list of MVPs, is used for motion vector derivation. The variable coding quad-tree block structure in HEVC can result in one block having several neighboring blocks with motion vectors as potential MVP candidates. Taking the left neighbor as an example, in the worst case a 64×64 luma prediction block could have 16 4×4 luma prediction blocks to the left when a 64×64 luma coding tree block is not further split and the left one is split to the maximum depth.

Advanced Motion Vector Prediction (AMVP) was introduced to modify motion vector competition to account for such a flexible block structure. During the development of HEVC, the initial AMVP design was significantly simplified to provide a good trade-off between coding efficiency and an implementation friendly design. The initial design of AMVP included five MVPs from three different classes of predictors: three motion vectors from spatial neighbors, the median of the three spatial predictors and a scaled motion vector from a co-located, temporally neighboring block. Furthermore, the list of predictors was modified by reordering to place the most probable motion predictor in the first position and by removing redundant candidates to assure minimal signaling overhead. The final design of the AMVP candidate list construction includes the following two MVP candidates; a) up to two spatial candidate MVPs that are derived from five spatial neighboring blocks; b) one temporal candidate MVPs derived from two temporal, co-located blocks when both spatial candidate MVPs are not available or they are identical; and c) zero motion vectors when the spatial, the temporal or both candidates are not available. Details on motion vector determination can be found in the book by V. Sze et al (Ed.), High Efficiency Video Coding (HEVC): Algorithms and Architectures, Springer, 2014, in particular in Chapter 5, incorporated herein by reference.

In order to further improve motion vector estimation without further increase in signaling overhead, it may be beneficial to further refine the motion vectors derived at the encoder side and provided in the bitstream. The motion vector refinement may be performed at the decoder without assistance from the encoder. The encoder in its decoder loop may employ the same refinement to obtain corresponding motion vectors. Motion vector refinement is performed in a search space which includes integer pixel positions and fractional pixel positions of a reference picture. For example, the fractional pixel positions may be half-pixel positions or quarter-pixel or further fractional positions. The fractional pixel positions may be obtained from the integer (full-pixel) positions by interpolation such as bi-linear interpolation.

In a bi-prediction of current block, two prediction blocks obtained using the respective first motion vector of list L0 and the second motion vector of list L1, are combined to a single prediction signal, which can provide a better adaptation to the original signal than uni-prediction, resulting in less residual information and possibly a more efficient compression.

Since at the decoder, the current block is not available since it is being decoded, for the purpose of motion vector refinement, a template is used, which is an estimate of the current block and which is constructed based on the already processed (i.e. coded at the encoder side and decoded at the decoder side) image portions.

First, an estimate of the first motion vector MV0 and an estimate of the second motion vector MV1 are received as input at the decoder 200. At the encoder side 100, the motion vector estimates MV0 and MV1 may be obtained by block matching and/or by search in a list of candidates (such as merge list) formed by motion vectors of the blocks neighboring to the current block (in the same picture or in adjacent pictures). MV0 and MV1 are then advantageously signaled to the decoder side within the bitstream. However, it is noted that in general, also the first determination stage at the encoder could be performed by template matching which would provide the advantage of reducing signaling overhead.

At the decoder side 200, the motion vectors MV0 and MV1 are advantageously obtained based on information in the bitstream. The MV0 and MV1 are either directly signaled, or differentially signaled, and/or an index in the list of motion vector (merge list) is signaled. However, the present disclosure is not limited to signaling motion vectors in the bitstream. Rather, the motion vector may be determined by template matching already in the first stage, correspondingly to the operation of the encoder. The template matching of the first stage (motion vector derivation) may be performed based on a search space different from the search space of the second, refinement stage. In particular, the refinement may be performed on a search space with higher resolution (i.e. shorter distance between the search positions).

An indication of the two reference pictures RefPic0 and RefPic1, to which respective MV0 and MV1 point, are provided to the decoder as well. The reference pictures are stored in the decoded picture buffer at the encoder and decoder side as a result of previous processing, i.e. respective encoding and decoding. One of these reference pictures is selected for motion vector refinement by search. A reference picture selection unit of the apparatus for the determination of motion vectors is configured to select the first reference picture to which MV0 points and the second reference picture to which MV1 points. Following the selection, the reference picture selection unit determines whether the first reference picture or the second reference picture is used for performing of motion vector refinement. For performing motion vector refinement, the search region in the first reference picture is defined around the candidate position to which motion vector MV0 points. The candidate search space positions within the search region are analyzed to find a block most similar to a template block by performing template matching within the search space and determining a similarity metric such as the sum of absolute differences (SAD). The positions of the search space denote the positions on which the top left corner of the template is matched. As already mentioned above, the top left corner is a mere convention and any point of the search space such as the central point can in general be used to denote the matching position.

According to the above mentioned document JVET-D0029, the decoder-side motion vector refinement (DMVR) has as an input the initial motion vectors MV0 and MV1 which point into two respective reference pictures RefPict0 and RefPict1. These initial motion vectors are used for determining the respective search spaces in the RefPict0 and RefPict1. Moreover, using the motion vectors MV0 and MV1, a template is constructed based on the respective blocks (of samples) A and B pointed to by MV0 and MV1 as follows:

Template=function ((Block A, Block B)).

Figure 3:
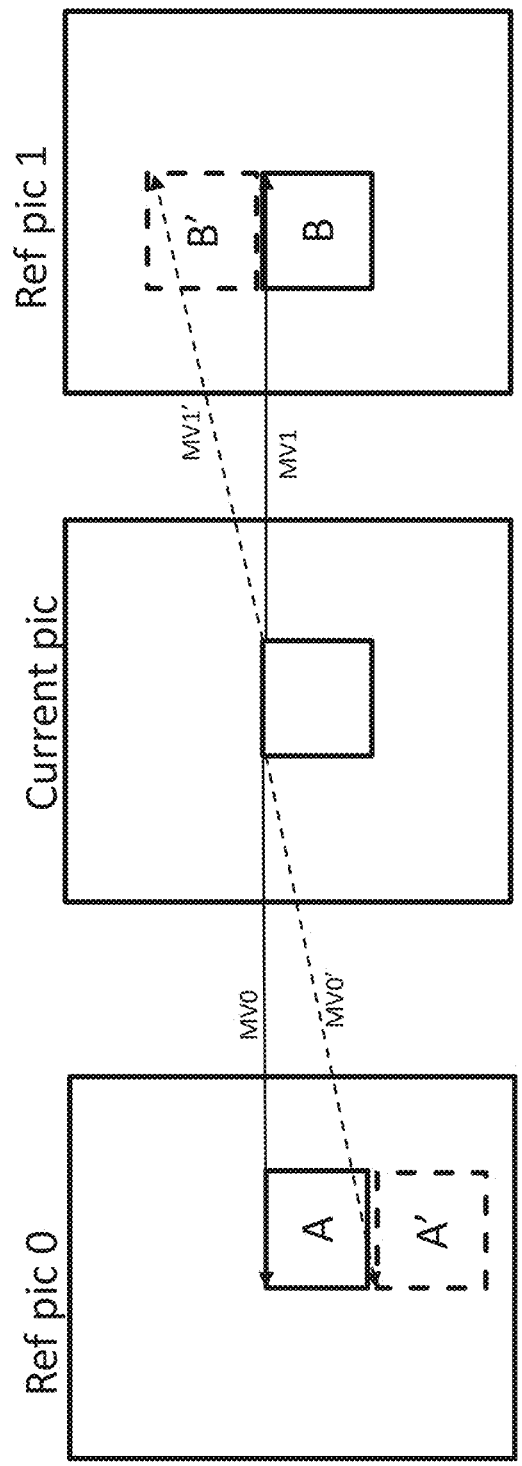
FIG. 3 is a schematic drawing illustrating an exemplary template matching suitable for bi-prediction.

The function may be sample clipping operation in combination with sample-wise weighted summation. The template is then used to perform template matching in the search spaces determined based on MV0 and MV1 in the respective reference pictures 0 and 1. The cost function for determining the best template match in the respective search spaces is SAD(Template, Block candA'), where block candA' is the candidate coding block which is pointed by the candidate MV in the search space spanned on a position given by the MV0. FIG. 3 illustrates the determination of the best matching block A' and the resulting refined motion vector MV0'. Correspondingly, the same template is used to find best matching block B' and the corresponding motion vector MV1' which points to block B' as shown in FIG. 3. In other words, after the template is constructed based on the block A and B pointed to by the initial motion vectors MV0 and MV1, the refined motion vectors MV0' and MV1' are found via search on RefPic0 and RefPic1 with the template.

Motion vector derivation techniques are sometimes also referred to as frame rate up-conversion (FRUC). The initial motion vectors MV0 and MV1 may generally be indicated in the bitstream to ensure that encoder and decoder may use the same initial point for motion vector refinement. Alternatively, the initial motion vectors may be obtained by providing a list of initial candidates including one or more initial candidates. For each of them a refined motion vector is determined and at the end, the refined motion vector minimizing the cost function is selected.

Figure 4:
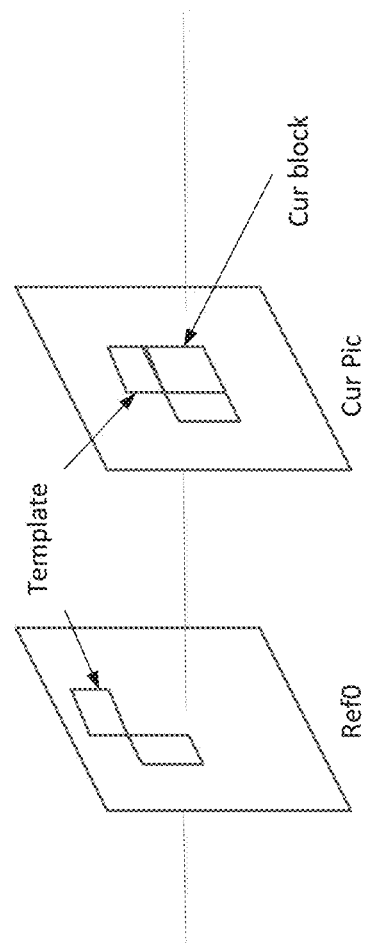
FIG. 4 is a schematic drawing illustrating an exemplary template matching suitable for uni- and bi-prediction.

It is further noted that the present disclosure is not limited to the template matching as described above with reference to FIG. 3. FIG. 4 illustrates an alternative template matching which is also applicable for uni-prediction. Details can be found in document JVET-A1001, in particular in Section "2.4.6. Pattern matched motion vector derivation" of document JVET-A1001 which is titled "Algorithm Description of Joint Exploration Test Model 1". by Jianle Chen et. al. and which is accessible at: http://phenix.it-sudparis.eu/jvet/. The template in this template matching approach is determined as samples adjacent to the current bock in the current frame. As shown in FIG. 1, the already reconstructed samples adjacent to the top and left boundary of the current block may be taken, referred to as "L-shaped template".

Figure 5:
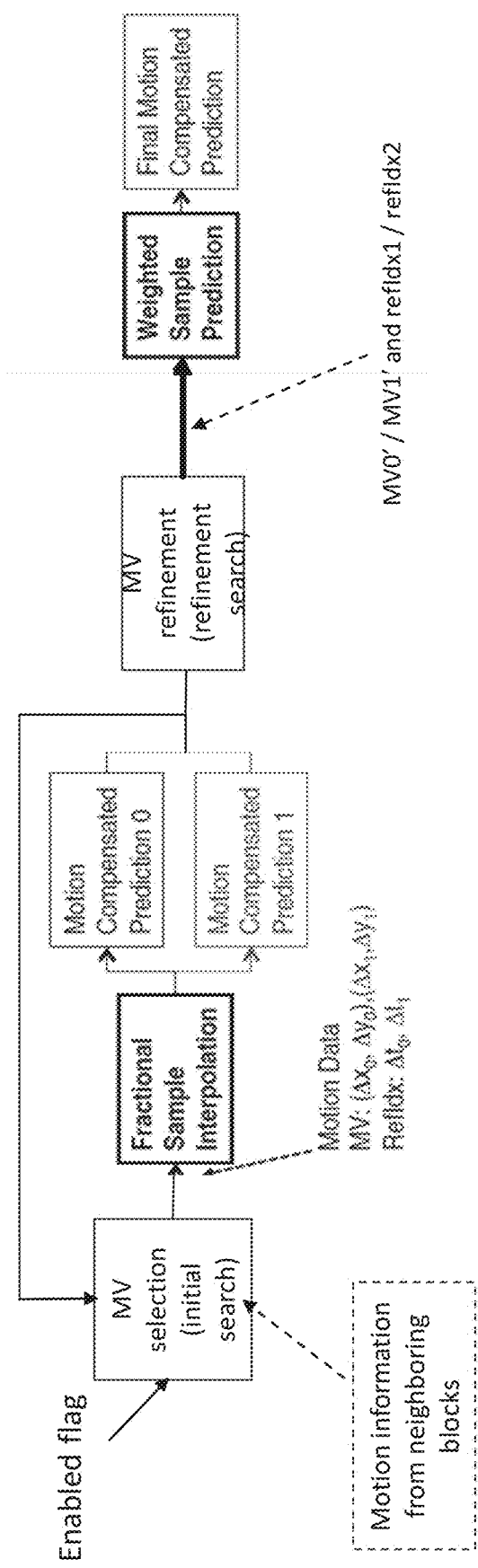
FIG. 5 is a block diagram illustrating stages of motion vector derivation operating without providing initial motion vectors to be refined in the bitstream.

FIG. 5 illustrates another type of motion vector derivation which may also be used. The input to the motion vector derivation process is a flag that indicates whether or not the motion vector derivation is applied. Implicitly, another input to the derivation process is the motion vector of a neighboring (temporally or spatially) previously coded/reconstructed block. The motion vectors of a plurality of neighboring blocks are used as candidates for the initial search step of motion vector derivation. The output of the process is MV0' (possibly also MV1', if bi-prediction is used) and the corresponding reference picture indices refPict0 and possibly refPict1 respectively. The motion vector refinement stage then includes the template matching as described above. After finding the refined one (uni-prediction) or more (bi-prediction/multi-frame prediction) motion vectors, the predictor of the current block is constructed (for bi/multi-prediction by weighted sample prediction, otherwise by referring to the samples pointed to by MV refined).

The present disclosure is not limited to the 2 template matching methods described above. As an example a third template matching method which is called bilateral matching (also described in the document JVET-A1001), can also be used for motion vector refinement and the disclosure applies similarly. According to bilateral matching, best match between two blocks along the motion trajectory of the current block in two different reference pictures is searched. Under the assumption of continuous motion trajectory, the motion vectors MV0 and MV1 pointing to the two reference blocks shall be proportional to the temporal distances, i.e., TD0 and TD1, between the current picture and the two reference pictures. In bilateral matching a cost function such as SAD(Block cand0', Block cand1') might be used where Block cand0' is pointed by MV0 and Block cand1' is pointed by MV1.

According to an embodiment of the disclosure, an apparatus is provided for determination of a motion vector for a prediction block, the apparatus including a processing circuitry. The processing circuitry is configured to obtain an initial motion vector and a template for the prediction block and determine a refinement of the initial motion vector by template matching with said template in a search space. Said search space is located on a position given by the initial motion vector and includes one or more fractional sample positions, wherein each of the fractional sample positions belonging to the search space is obtained by interpolation filtering with a filter of a predefined tap-size assessing integer samples only within a window, said window being formed by integer samples accessible for the template matching in said search space.

Figure 6:
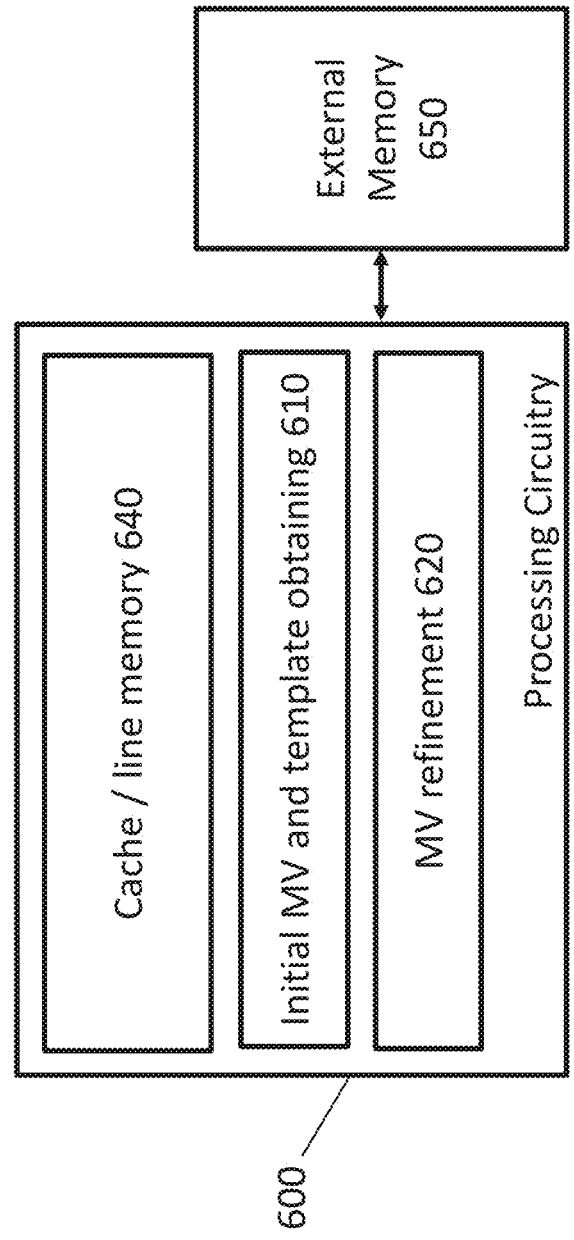
FIG. 6 is a block diagram illustrating an exemplary hardware to implement an embodiment of the disclosure.

The processing circuitry 600 is illustrated in FIG. 6. The processing circuitry may include any hardware and the configuration may be implemented by any kind of programming or hardware design of a combination of both. For instance, the processing circuitry may be formed by a single processor such as general purpose processor with the corresponding software implementing the above steps. On the other hand, the processing circuitry may be implemented by a specialized hardware such as an ASIC (Application-Specific Integrated Circuit) or FPGA (Field-Programmable Gate Array) of a DSP (Digital Signal Processor) or the like.

The processing circuitry may include one or more of the above mentioned hardware components interconnected for performing the above motion vector derivation. The processing circuitry 600 includes computation logic which implements two functionalities: obtaining the initial motion vector (or a plurality of initial motion vectors if bi-/multi-prediction is used) and template 610 and motion vector refinement 620. These two functionalities may be implemented on the same piece of hardware or may be performed by separate units of hardware such as initial motion vector and a template determination unit 610 and motion vector refinement unit 620. The processing circuitry 600 may be communicatively connected to an external memory 650 in which the reconstructed reference picture samples are stored. Moreover, the processing circuitry 600 may further include an internal memory 640 which buffers the samples in a window transferred from the external memory and used for the motion vector determination for the currently processed block. The processing circuitry may be embodied on a single chip as an integrated circuit.

It is noted that the processing circuitry may implement further functions of the encoder and/or decoder described with reference to FIGS. 1 and 2. The internal memory may be an on-chip memory such as a cache or a line memory. Chip memory is advantageously implemented on the encoder/decoder chip to speed up computations. Since the size of the chip is limited, the on-chip memory is usually small. On the other hand, the external memory can be very large in size, however the access to external memory consumes more energy and the access is much slower. Usually the all necessary information is retrieved from the external memory to on-chip memory before the computations are performed. Worst case external memory access (or bandwidth that needs to be provisioned when designing the memory bus), denotes the largest possible amount of memory transfer between external memory and the chip, while decoding a frame or coding unit. The memory (especially the external memory) can usually only be accessed in predefined block units. In other words it is generally not possible to access a single pixel, instead a smallest unit (e.g. 8×8) must be accessed. The on-chip memory size is also an important design consideration, as a larger on chip memory increases the cost.

In other words, the above mentioned apparatus may be an integrated circuit further comprising: an internal memory embedded within the integrated circuit and a memory access unit (interface) for fetching integer samples located within said window from an external memory to the internal memory.

The term "prediction block" employed above refers to the current block which is to be predicted. It is a block within the image which may be obtained by subdividing the image into equally sized or differently sized (for instance by hierarchical partitioning of a coding tree unit, CTU into the smaller units) blocks. The block may be square or more generally rectangular as these are the typical shapes also employed in current encoders/decoders. However, the present disclosure is not limited by any size/shape of the block.

The apparatus including the processing circuit may be the encoder or decoder or even an apparatus including such encoder or decoder, for instance a recording device and/or a play back device.

Fractional sample positions are positions between the real picture sample positions obtained by reconstructing the reference picture which was coded as show in FIG. 1. Thus, the fractional positions must be obtained by interpolation based on the nearest integer positions. Details of an example interpolation filtering which is used by H.265 can be found in Section "5.3 Fractional Sample Interpolation" of High Efficiency Video Coding (HEVC) book by V. Sze et. al., Springer, 2014.

Interpolation filtering usually applies different filters in order to generate different fractional pel (sample) positions. As an example following 1D separable filters are applied to generate quarter pel and half pel positions in H.265 video compression standard:

| Phase | Luma filter coefficients |
|---|---|
| 1/4 | [−1, 4, −10, 58, 17, −5, 1]/64 |
| 1/2 | [−1, 4, −11, 40, 40, −11, 4, −1]/64 |

As can be seen from the above table, the interpolation filtering requires several samples around the fractional pel position, corresponding to the filter taps (number of coefficients in the table). Using the example filters above in order to generate a half pel position 4 integer samples from left/top and right/bottom are required. It should be noted that the length of the interpolation filter is different for quarter pel sample positions (which is 7 tap) than the half pel sample positions (which is 8 tap).

In some embodiments of the disclosure, the interpolation filter of a predefined tap-size assesses integer samples only within a window given by integer samples accessible for the template matching in said search space. The window might include much more samples than the ones actually used in computations of a certain prediction block. This is due to the fact that the refinement search operation is usually implemented using a fast search method (as opposed to the brute force search method), according to which some of the samples are not evaluated depending on the gradual progression of the search operation. As a result the number of template matching iterations as well as the samples that are used in computations for refinement search operation might change for each prediction block.

The present disclosure sets the upper limits (territorial boundary) for the integer samples that can be used during the refinement search operation, considering that the interpolation filtering needs to be applied for fractional sample positions. This corresponds to the term "integer samples accessible for the template matching". Which samples are actually accessed depends on the way of forming the search space as will be exemplified in the following.

Figure 7:
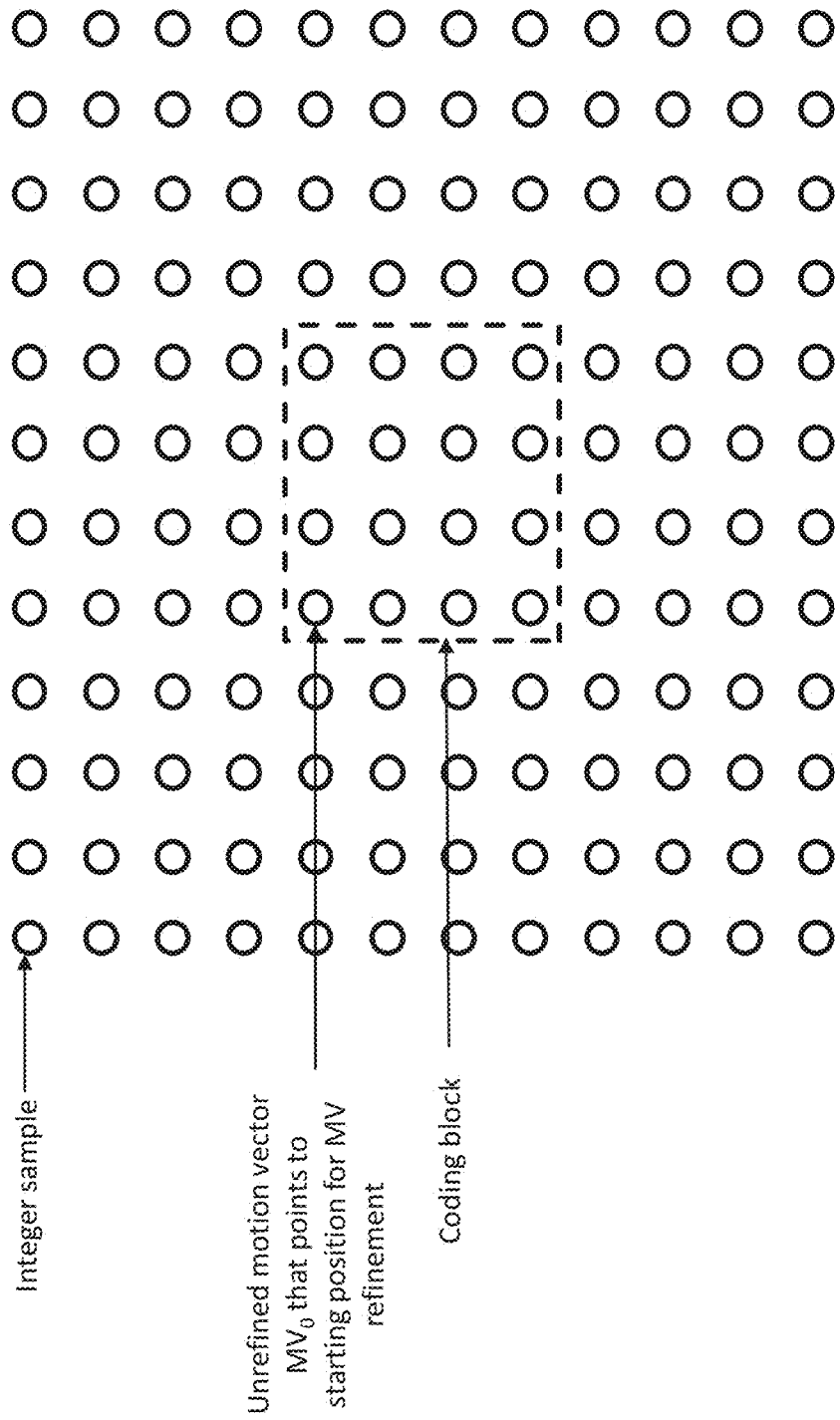
FIG. 7 is a schematic drawing illustrating for a coding block an exemplary window with samples which should be available to be accessed.

FIG. 7 illustrates a coding block (prediction block) and the corresponding samples of the window. It is noted that the samples shown in FIG. 7 are reference picture samples and the coding block here is actually a block corresponding in size and position to the current block in the current frame for which the motion vector is to be derived in the reference picture. Thus, in fact, the coding block in FIG. 7 is in fact a block co-located to the block for which the predictor is searched. However, for the simplicity reason, this block is referred as "coding block" in the following.

In this example, unrefined motion vector MV0 points to an integer sample position (The initial motion vector can point to a fractional sample position, integer sample position is selected only for ease of depiction). The motion vector refinement search granularity is 1 integer sample, meaning that since the starting point is an integer sample, only integer sample points are searched. The search is performed, in this example, in a gradually developing search space. This means that the search space is in each iteration advanced by adding new search positions depending on the best direction in terms of cost function for the previously tested positions.

Figure 8:
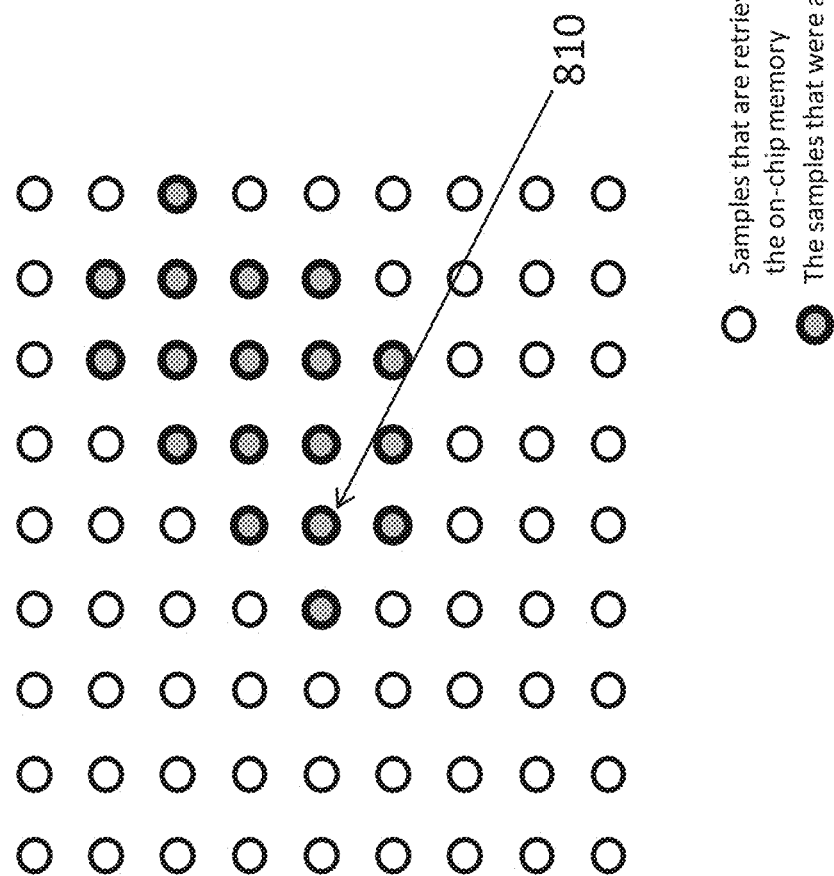
FIG. 8 is a schematic drawing illustrating iterative search space.

Such approach is illustrated in a simplified manner in FIG. 8. In FIG. 8, the initial motion vector pointed to the center point 810. The search space is gradually constructed around the initial motion vector position. In the first step, four positions immediately adjacent on the top, bottom, left and right to the position 810 pointed to by the initial motion vector as well as the position 810 pointed to by the initial motion vector are tested. Based on the direction which results in a lowest cost function among the tested five points, further positions to be tested are added to the search space. In this example, the lowest cost function could be seen in the right point and so the search space was extended by three further points in the horizontal right direction in the second step. In the second step the lowest cost function could be seen in right point (with respect to the lowest cost point of the first step), resulting in a further extension of the search space by three points in the horizontal right direction. In the third step the lowest cost function is observed again in the right point with respect to the lowest cost point of step 2 and results in the extension of the search space by three more points in the horizontal right direction. According to the example in FIG. 8, three more steps are performed in the top, top and right directions in that order. In the example a diamond shaped pattern (consisting of 5 search points) is used for each iteration and the search space is extended in order to complete the missing search points at each step.

In each iteration of the search space determination, the search space may grow by one or more integer sample position. Returning now to FIG. 7 in the example of which the maximum number of search iterations is 4. Since the maximum number of 4 iterations are possible, all of the samples depicted on the left need to be retrieved from the memory to perform the search operation, in case the gradual development of the search space goes to the left. Similarly, 4 samples extension to the top is needed. Thus, the search space is extended in both directions (left-right and top-bottom) since the refined MV can move in either direction and the hardware implementations require that all of the samples that might be required are fetched from external memory before the application of refinement search. If the search space develops in the bottom or right direction, extension by 4 further samples is necessary since the template matching with a template corresponding to the size of the coding block (prediction block) will need to access some of those samples. Moreover, the corner samples (e.g. top-right) must also be fetched from the memory, since hardware implementations typically cannot fetch irregular shapes (rectangular access is more feasible).

It is noted that the above described iterative search space development is only exemplary and the rules and number of points to extend the search space in each iteration may differ, i.e. be specified in a different way.

FIG. 8 also shows a scenario which may occur due to the external memory access rules described above. The number of samples that are fetched from the external memory is much higher than the samples that are actually used in the computation step. Assuming that the template here is only one sample large (for simplicity reason), the white circles represent samples that are retrieved from the external memory and the shaded samples that are actually used. However, such redundancy is necessary if the number of accesses to the external memory is to be kept low since when the current block is started to be processed, the actually needed samples are not yet known.

It is noted that the search space may also be defined in a different way, for instance as a stabile shape located at the position pointed to by the initial motion vector. The shape may be any shape such as square, rectangle, diamond, or the like.

Figure 9:
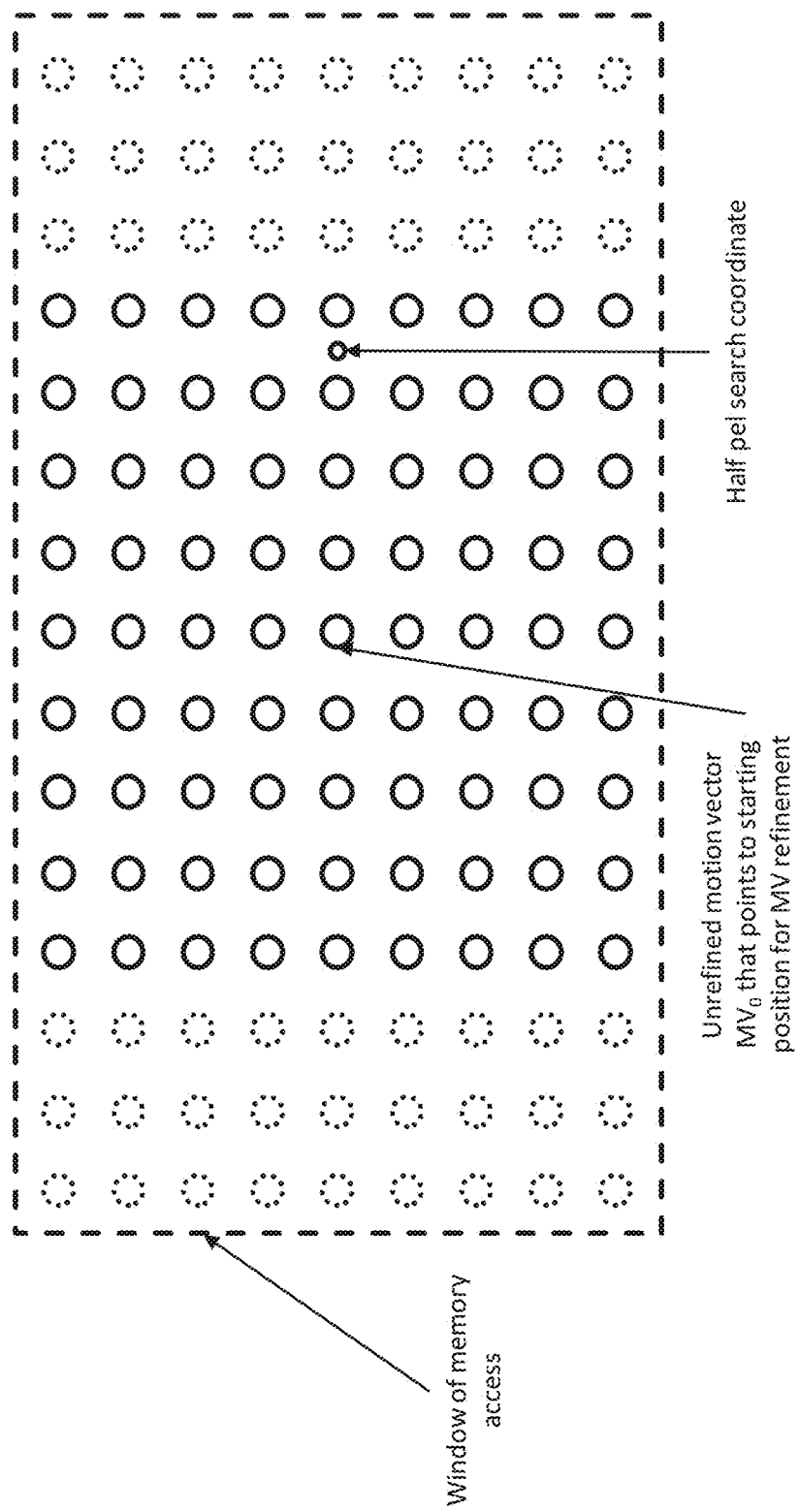
FIG. 9 is a schematic drawing illustrating extension of the memory access window in horizontal direction due to interpolation filtering.

FIG. 9 illustrates an example in which the search space may also include fractional samples. In FIGS. 7 and 8, the motion vector search was performed on integer samples resulting in the positions indicated by solid-line larger dots included in the access window. If now the search is performed on a sample that has half-pel resolution (smaller solid-line dot), in order to generate the fractional sample, depicted on the right hand side, three more columns of samples need to be retrieved from the memory as well, assuming that the interpolation filter is symmetric and has eight taps. Moreover same must be applied on the left side (extension by 3 columns of pixels) due to the fact that search operation is symmetric (can move iteratively to the left and right) so that a fractional pixel may be located on the left side of the window.

As a result due to interpolation filtering the number of samples necessary to be retrieved from the memory is further increased, indicated by the dashed line now also included the dotted-line circles representing the positions added due to fractional interpolation. Similarly if one allows half per positions in the vertical direction to be searched as well, the window of samples to be accessed from the memory needs to be extended in the vertical direction too (not shown in the example of FIG. 9), on the top and bottom sides.

Window of memory access is defined as the rectangle that encloses all of the samples that need to be retrieved from the memory in order to perform the motion vector search for a prediction block (coding block). The window of memory access not only includes the actual samples that are required, but also all of the remaining samples that have the possibility of being accessed during the motion vector search operation. In the example of FIG. 9, the motion vector search moved to the right. But it could have been moved to the left direction as well, which is not known beforehand. Accordingly, in order not to access the external memory several times, the window of memory access (or access window) includes all samples accessible by the respective processing.

Figure 10:
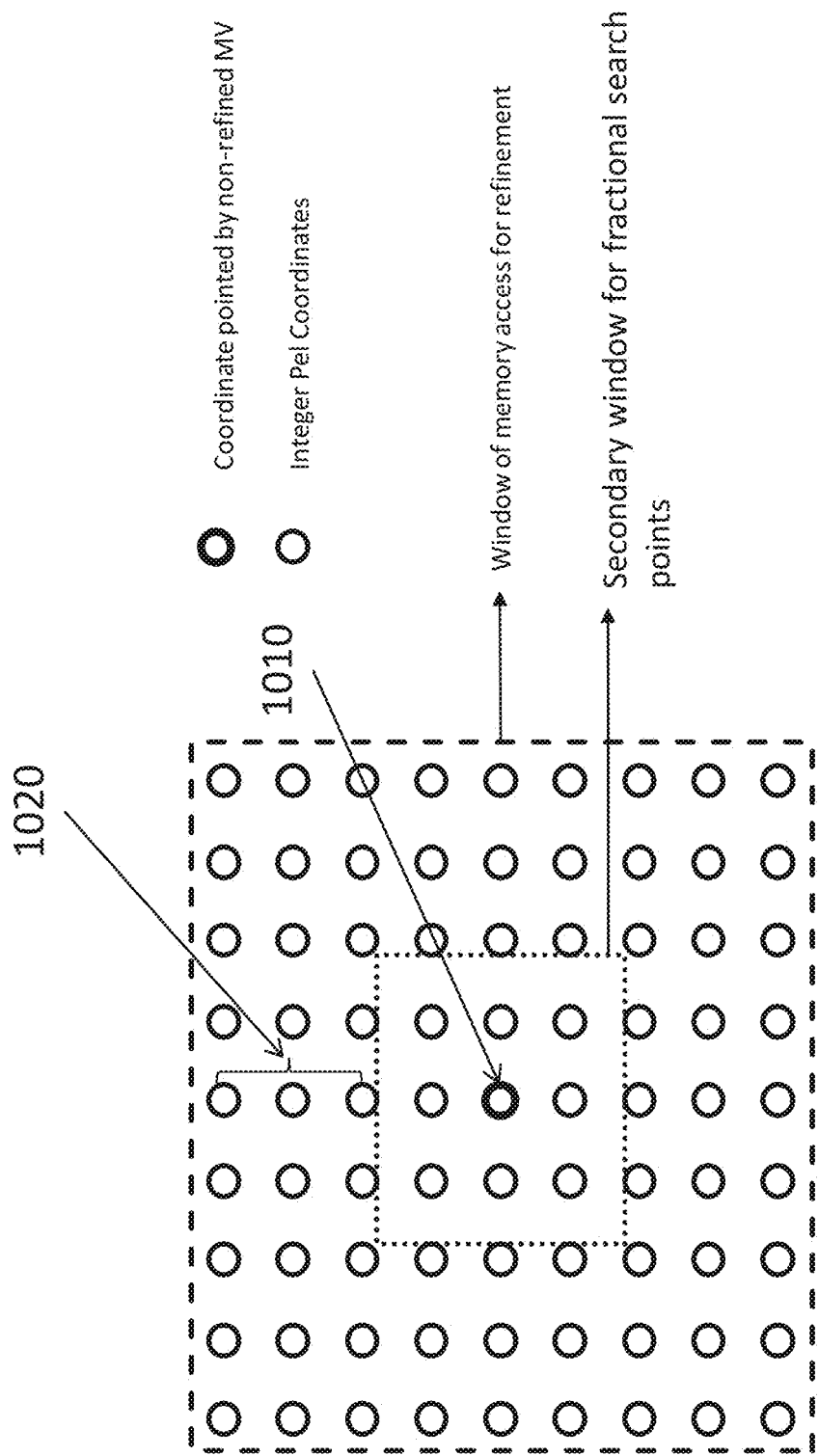
FIG. 10 is a schematic drawing illustrating definition of a sub-window for fractional sample positions.

FIG. 10 shows a window of memory access for motion vector refinement. Center point 1010 is the position pointed to by the non-refined input motion vector (initial motion vector obtained either from the bitstream or by previously performed template matching or testing of the candidates as described above). In order to avoid further increasing of the window size due to adding fractional positions to the search space, motion vector refinement is performed according to following rules:

A) A window of memory access for refinement is defined around the non-refined initial motion vector coordinate (i.e. position pointed to by the initial motion vector). The window identifies the maximum number of pixel samples that need to be accessed from the memory in order to perform motion vector refinement by template matching in a search space.

1. In this example, for the sake of simplicity, the size of the current block (coding block size) is 1×1 sample, but it can be larger and it typically would be larger.

2. The window of memory access is defined as the extension around the coding block, such as 4 samples from left/right and 4 samples from top/bottom shown in the figure.

B) The fractional pixel coordinates are accessed for MV refinement only if samples necessary for interpolation lie inside the window of memory access.

Requirement B ensures that the access window defined by the samples necessary for motion vector refinement on integer samples is not further extended. The actual fractional samples accessible according to this rule are given by the size and shape of the interpolation filter. Accordingly, in FIG. 10, assuming an interpolation filter with 6 taps, the dotted line indicates a region in which the fractional samples may be located. However, it is noted that further fractional pixel positions may be allowable as will be shown with reference to FIG. 12. In particular, fractional positions which require only vertical or only horizontal filtering which does not require extension beyond the access window may still be used. Thus, limiting the fractional positions to the fractional sample window shown in FIG. 10 may be too limiting for some applications.

In other words, according to an embodiment, the memory access window includes all samples that are accessible by the motion vector refinement performed on integer samples and do not include samples that are not accessible by motion vector refinement performed on integer samples. Thus, if fractional samples are used for motion vector refinement, they are obtained in a manner which does not require additional samples.

In the example of FIG. 10, this is achieved by only allowing fractional samples which, for a predefined interpolation filter shape and size, do not require samples out of the access window. The dotted fractional sample window extends within the access window. If T is the number of interpolation filter taps, then the fractional sample window border is defined by integer samples in a distance 1020 of floor(T/2)−1 from the access window border samples. In particular, in this example T=6, T/2=3 and the distance from the access window border sample to the fractional window sample is T/2−1=2 integer samples.

However, it is noted that this determination of the fractional window is a mere example. In general, the window may have a different form and size. The vertical and horizontal interpolation may be done by filters with different sizes. Moreover, some fractional positions may require filter in both vertical and horizontal direction which may in general by separable or non-separable.

Alternatively, the interpolation filter could be changed (e.g. number of taps at least in one direction reduced) for the fractional positions outside the dotted window in FIG. 10. However, for implementation purposes and for interpolation quality reasons, such solution may be less attractive.

Figure 11:
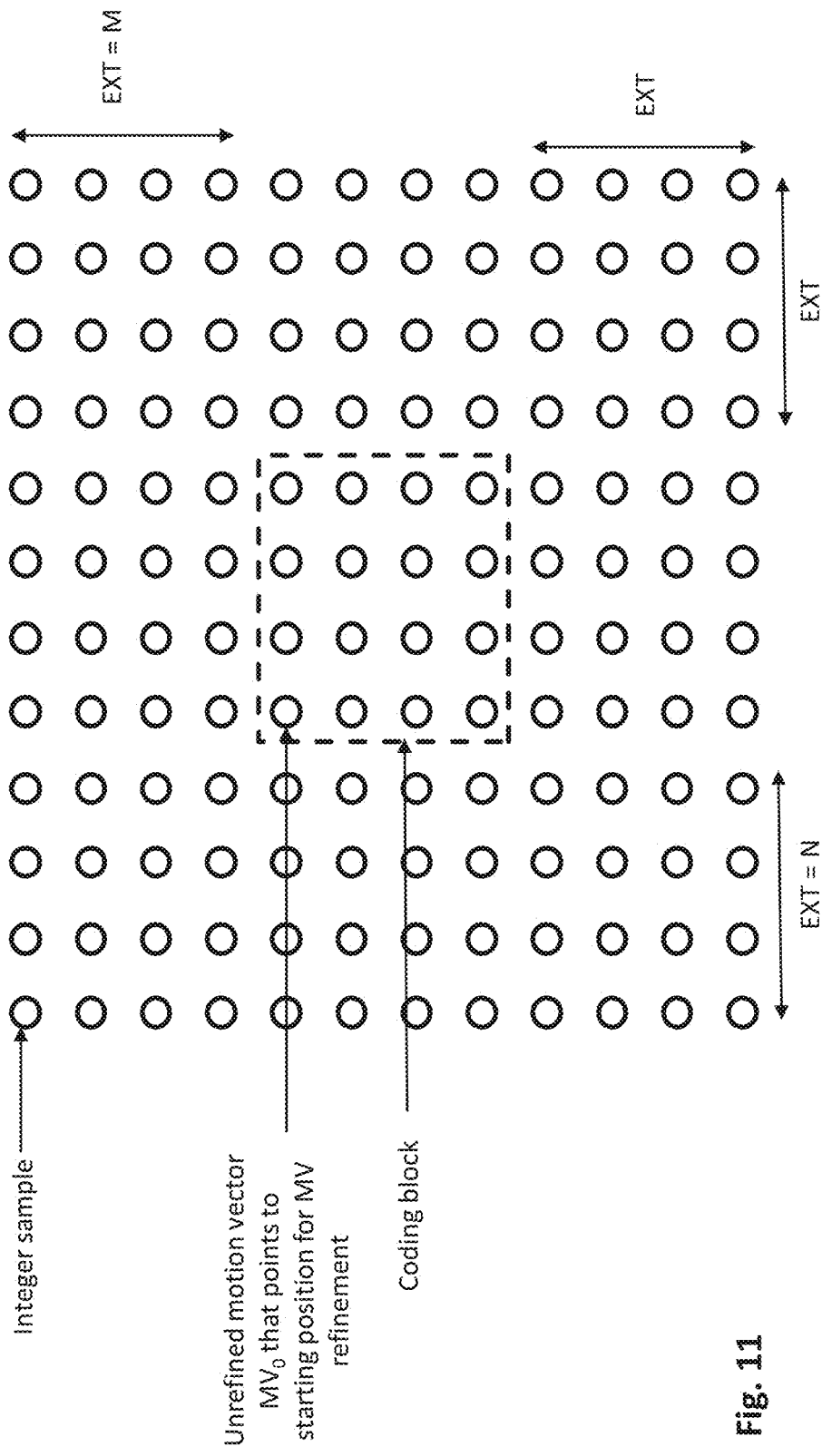
FIG. 11 is a schematic drawing illustrating an exemplary definition of the memory access window.

The window for memory access may be defined in various ways. FIG. 11 illustrates an example in which the memory access window is defined as extensions EXT on the left/right or up/down of the coding block (corresponding to the location of the coding block given by the initial motion vector). The extension amounts may depend on the size and the shape of the coding or prediction block. In FIG. 11, the extension is 4 samples long in each direction (top, bottom, left, right). However, it is noted that the EXT may also take different values for the different directions, depending on the block size (which may have different size in vertical and horizontal direction) and/or the search space form and size.

For instance, according to an example, the window is defined as N integer sample columns and M integer sample rows relative to the prediction block initial motion vector, at least one of N and M being non-zero integer values (both being integer, but one of them can be zero). In FIG. 11, the N and M are indicated but have the same size. As mentioned above, N and M may have a different size. N and M are integers and at least one of them are non-zero. Taking parameters N and M and the template form and size, the size of the access window can be determined. In particular, if the template has T1 rows and T2 columns, the size of the memory access window may be calculated as (N+T2+N) rows and (M+T1+M) columns. This is because the search can go N samples left or right resulting in 2N samples horizontally and M samples up or down resulting in 2M samples vertically.

On the other hand, for specific approaches of search space constructions as the one described with reference to FIGS. 7 and 8, the memory access window can be defined in terms of maximum number of refinement iterations (search space construction iterations) and iteration step size (in terms of maximum sample distance achievable in each iteration), which can be later converted to maximum amount of displacement in left, right, up and down. Therefore the memory access window is defined as the maximum displacement in each direction. For instance, the 4 iterations in which each iteration may advance the search space in maximum one integer sample position result in EXT=4.

In other words, according to this example, the processing circuitry is configured to determine the refinement of the initial motion vector by template matching with said template in a search space which is iteratively extended in a direction given by one (or more) of more best matching positions of the search space in a most recent iteration, the window is defined by a predefined maximum number of the iterations.

It is noted that in general, the present disclosure is not limited to any particular shape or form or kind of determination of the search space. In another example, search space is a rectangular sub-window of the window such that all integer samples accessed for interpolation filtering of each fractional sample in the sub-window are located within said window for the interpolation filter with the predefined tap-size. A similar example has been already discussed above with reference to FIG. 10. In FIG. 10, the search space is given by the 9×9 integer samples and fractional samples located within the region formed by 5×5 integer samples with the initial motion vector position in their center.

The definition of the memory access window may be relevant in order to possibly include the corresponding signaling parameter into the bitstream (for instance parameter EXT or parameters N and M). However, the memory access window size may also be defined in the standard or derivable on the basis of other coding parameters (such as template size, prediction block size, image resolution, etc.).

Figure 12:
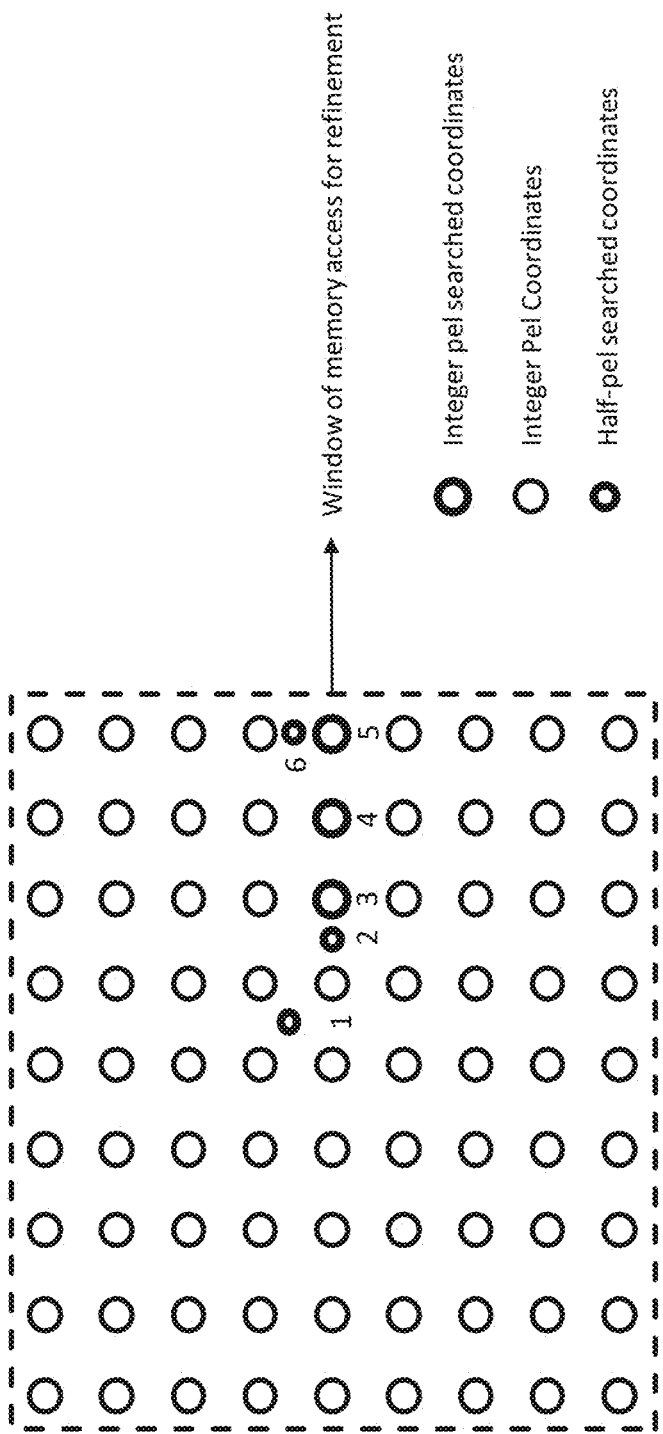
FIG. 12 is a schematic drawing illustrating exemplary positions including fractional positions which are allowed to form search space positions for motion vector refinement.

FIG. 12 illustrates an example with different fractional pixel positions. For this example, it is assumed that the size of the template is 1×1 samples (for simplicity) and 6 tap interpolation filter is used for each half-pel position. In the example, the search coordinates that are searched are denoted by numbers 1-6 which indicate the order they are checked, i.e. the order in which the template matching search is performed. Positions 1 and 2 are half-pel position (meaning that they are located in the middle between two integer sample positions, pel is an abbreviation for pixel and the term pixel is used interchangeably with the term sample in this application). Positions 1 and 2 are checked since the necessary extension for interpolation filtering lies inside the window of memory access (3 integer samples on the diagonal top-left and 3 integer samples bottom-right from position 1; 3 integer samples to the right and 3 integer samples to the left of position 2). Note that fractional sample point 1 requires extension both in horizontal and vertical direction, both of which lie inside the window. Position 2 only requires extension to the right and to the left.

Positions 3, 4 and 5 are integer sample (integer-pel) positions. They can be searched since no extension for interpolation filtering is necessary. Fractional (half-pel) sample 6 can also be accessed since only an extension in the vertical direction (by three integer positions up and down respectively) is necessary which is still inside the window. No extension in the horizontal direction is necessary. Still, in the above implementation fractional sample points are accessed only if necessary interpolation extension is within the memory access window.

In other words, according to an example, the interpolation filter is a one-dimensional filter assessing K either horizontal or vertical integer samples when the fractional position is located on a respective horizontal or vertical line of integer samples.

Such one-dimensional fractional positions (e.g. positions 2 and 6 in FIG. 12) located on a line between two horizontally or two vertically adjacent integer positions require an extension for interpolation only in horizontal direction or only in vertical direction, i.e. are to be filtered only by a respective horizontal or vertical interpolation filter. In order to be able to make use of as many fractional positions as possible, in addition to the fractional positions allowed in the example of FIG. 10, it may be advantageous to add further one-dimensional positions such as position 6 shown in FIG. 12.

In other words, the search space further includes fractional positions located outside the fractional sub-window (cf. dotted window of FIG. 10) either:
 adjacent on the top or on the bottom of the sub-window and located on the horizontal line of integer samples or
 adjacent on the left or on the right hand side of the sub-window and located on the vertical line of integer samples.

It is noted that some fractional samples might require more integer samples in a given direction, horizontal or vertical. This may be the case if the predefined filter size is different to generate that position in the respective directions.

Figure 13:
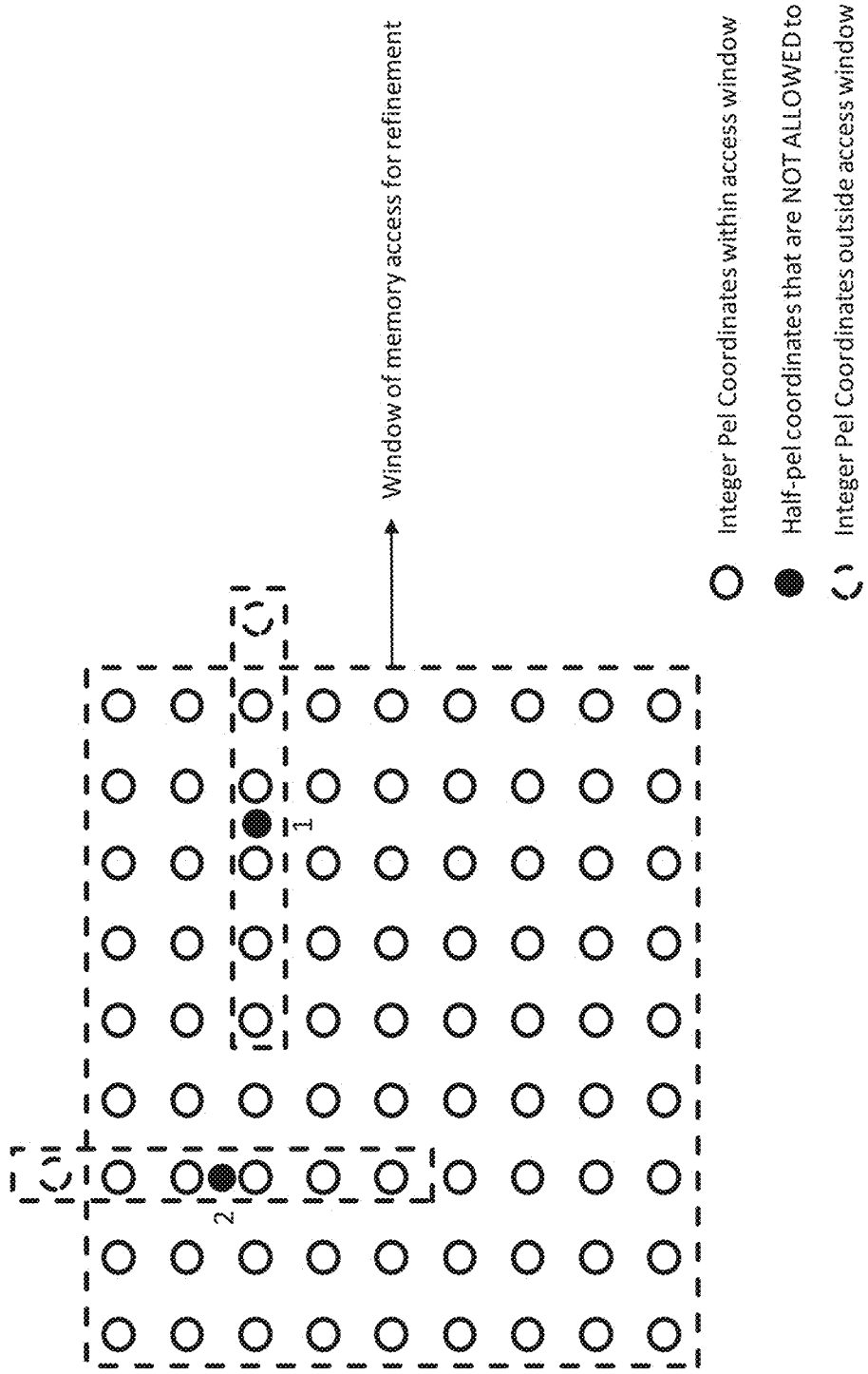
FIG. 13 is a schematic drawing illustrating exemplary fractional positions which are not allowed to form search space positions for motion vector refinement.

FIG. 13 illustrates an example of fractional half-pel positions 1 and 2 which cannot be accessed. They are located outside the sub-window shown in FIG. 10. For this example, it is assumed that 6 tap interpolation filter is used for half pel positions. The half-pel search points 1 and 2 are not allowed to be searched, since horizontal or vertical interpolation filtering requires samples that lie outside of the window. The integer sample positions needed by the horizontal filter to filter position 1 and the vertical filter to filter position 2 are indicated by a dashed line in FIG. 13. As can be seen, dashed circles correspond to the integer positions which are not within the memory access window.

In the above examples, the memory access window was defined so that no sample outside of the window is accessed (even for interpolation filtering) during the motion vector refinement process. In other words memory access window is the smallest window that encloses the samples that might need to be accessed for motion vector refinement and interpolation. Moreover, the memory access window has been designed according to the samples necessary for motion vector refinement based on integer sample positions. Then, only fractional positions are allowed which do not require further extension of such access window by further integer positions.

It is noted that the above examples were provided for half-pel interpolation. However, the present disclosure is not limited thereto. In general, any fractional position such as ¼, ⅛, or the like may be used, i.e. interpolated using the corresponding interpolation filter.

The processing circuitry described with reference to FIG. 6 may be employed in an encoder and/or decoder as shown in FIGS. 1 and 2.

In particular, an encoding apparatus may be provided for encoding video images split to prediction blocks into a bitstream, the encoding apparatus comprising: the apparatus for determination of a motion vector for a prediction block as described above including the processing circuitry; and an encoding circuitry for encoding difference between the prediction block and the predictor given by a prediction block in a position specified by the determined motion vector and for generating bitstream including the encoded difference and the initial motion vector.

Further units and functions of the encoder described above with reference to FIG. 1 may also be provided or implemented in the processing circuitry.

Correspondingly, a decoding apparatus may be provided for decoding from a bitstream video images split to prediction blocks, the decoding apparatus comprising: a parsing unit for parsing from the bitstream an initial motion vector and an encoded difference between a prediction block and a predictor given by a prediction block in a position specified by a refined motion vector; the apparatus for determination of the refined motion vector for the prediction block as described above including the processing circuitry; and a decoding circuitry for reconstructing the prediction block as a sum of the parsed difference and the predictor given by the prediction block in the position based on by the refined motion vector. For example, the predictor may be directly given by the position of the refined motion vector. However, there may be further processing steps of obtaining the motion vector of the current prediction block which may further change the motion vector (such as filtering, clipping, further refinement or the like).

Further units and functions of the decoder described above with reference to FIG. 2 may also be provided or implemented in the processing circuitry.

Moreover, the embodiments of the disclosure were described from the point of view of the apparatus with the processing circuitry to perform the motion vector refinement. However, the present disclosure is not limited thereto but also provides the corresponding methods which include the processing steps corresponding to those for the performing of which the above described processing circuitry is configured.

In particular, a method is provided for determination of a motion vector for a prediction block including the steps of: obtaining an initial motion vector and a template for the prediction block; determining a refinement of the initial motion vector by template matching with said template in a search space, wherein said search space is located on a position given by the initial motion vector and includes one or more fractional sample positions, wherein each of the fractional sample positions belonging to the search space is obtained by interpolation filtering with a filter of a predefined tap-size assessing integer samples only within a window; said window being formed by integer samples accessible for the template matching in said search space.

The taps corresponds to the filter coefficients. The tap-size corresponds to filter order. Here, it is assumed that the filter is a linear filter. In some examples, the filter may be symmetric, i.e. having symmetric coefficients. However, the present disclosure is not limited to symmetric filters or linear filters or any kind of filters. In general, the fractional positions may be obtained in any way based on the adjacent samples.

Moreover an encoding method is provided for encoding video images split to prediction blocks into a bitstream, the encoding method comprising the steps of determining a motion vector for a prediction block according to any of methods described above; as well as encoding difference between the prediction block and the predictor given by a prediction block in a position based on the determined motion vector and for generating bitstream including the encoded difference and the initial motion vector.

The encoding method may further include steps described with reference to functions of blocks in FIG. 1.

Still further, a decoding method is provided for decoding from a bitstream video images split to prediction blocks, the decoding method comprising: parsing from the bitstream an initial motion vector and an encoded difference between a prediction block and a predictor given by a prediction block in a position specified by a refined motion vector; determining the refined motion vector for the prediction block according to any of methods mentioned above; and reconstructing the prediction block as a sum of the parsed difference and the predictor given by the prediction block in the position specified by the refined motion vector.

The decoding method may further include steps described with reference to functions of blocks in FIG. 2.

However, it is noted that FIGS. 1 and 2 are not to limit the present disclosure. They merely provide a non-limiting example of an implementation of present disclosure within the existing encoder and/or decoder.

Figure 14:
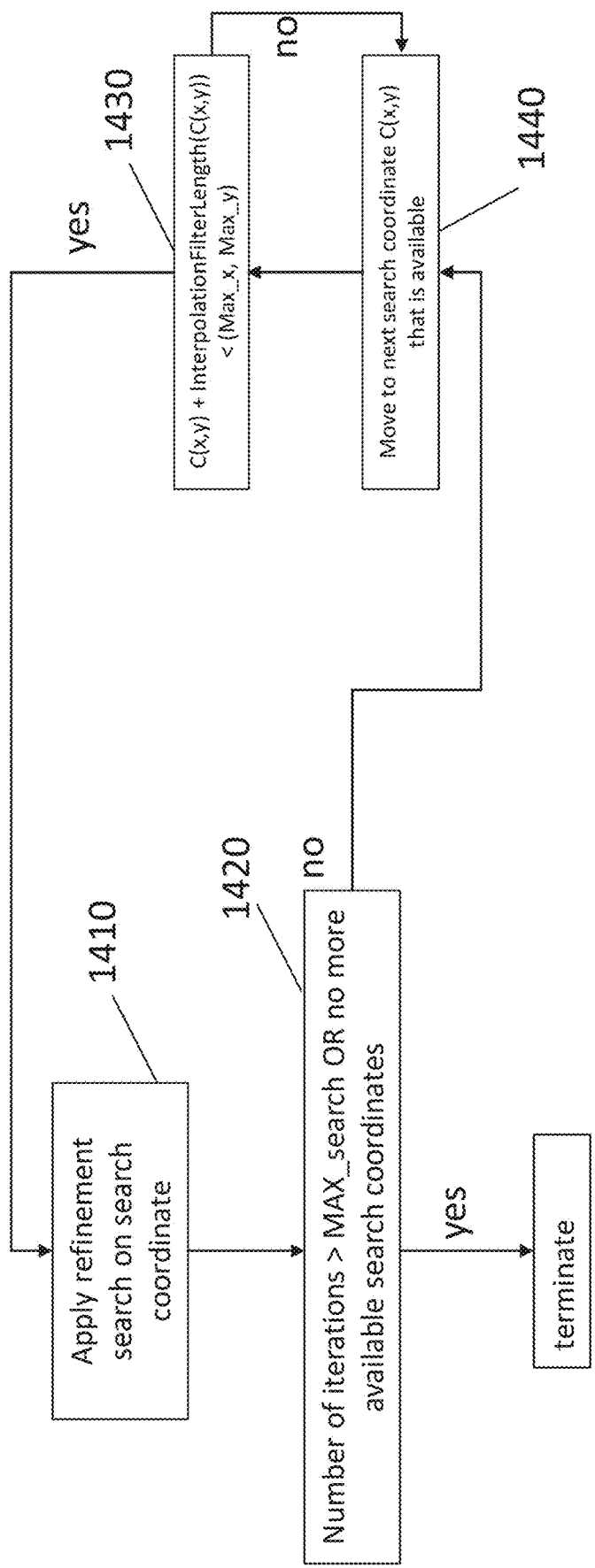
FIG. 14 is a flow diagram illustrating method for determining which position of a search space are allowed to be tested by template matching for motion vector refinement.

FIG. 14 shows an exemplary implementation of a method according to an embodiment. A function InterpolationFilterLength(C) returns the number of additional samples necessary in the horizontal and vertical directions in order to apply interpolation filtering. The number of necessary samples changes depending on:
  Whether the search coordinate is integer pel, half pel, or quarter pel position.
  Whether horizontal, vertical or both of the interpolation filters need to be applied to generate the search coordinate sample.

The method starts in step 1430. In particular, the initial motion vector position is the first search space position C(x,y) to be tested. The function InterpolationFilterLength (C) returns for this position the number of samples in the horizontal and vertical directions in order to apply interpolation filtering. If the sum of C(x,y) and InterpolationFilterLength(C(x,y)) exceeds the access window size defined by MAX (max_x, max_v), then the position is not used as a part of the search space. Instead, next search coordinate C(x, y) is selected in step 1440 to be tested (for instance, x or y or both are incremented, depending on the order in which the search is performed). If the tested position in step 1430 does not require exceeding the access window, in step 1410 the template matching as a part of the motion vector refinement is performed for that position C(x,y). Then it is tested in step 1420, whether there are still search space positions left for template matching. If not, the refinement is terminated. If yes, the next coordinate is selected in the step 1440 and the condition of step 1430 is evaluated for that new position. These steps are repeated.

As already described above, alternative possibilities exist to define the allowed fractional positions (such as the window in FIG. 10, possibly extended by further fractional samples as shown in FIG. 12). Based thereon, a simpler condition may be formulated in step 1430 merely evaluating whether the position C(x,y) belongs to the allowed window. For instance, the search is restricted to the integer search points and the fractional points within a fractional search window encapsulated in the memory access window as the one illustrated in FIG. 10.

The search space may include a rectangular search sub-window of the window, and the refinement of the initial motion vector may be determined by template matching with said template in the rectangular search sub-window such that the integer samples accessed for interpolation filtering of each fractional sample in the search sub-window are located within said window for the interpolation filter with the predefined tap-size.

Figure 15:
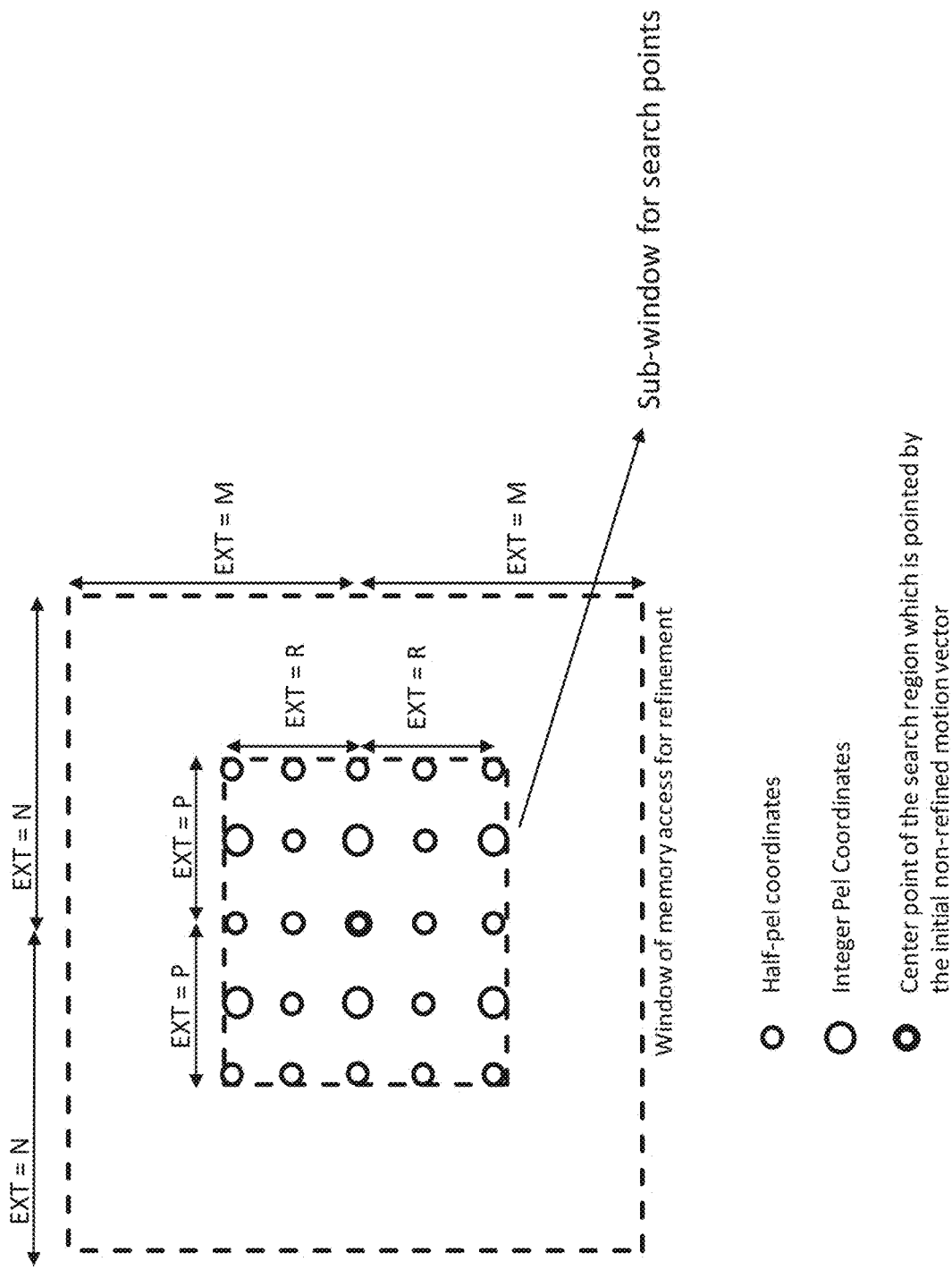
FIG. 15 is a schematic drawing illustrating exemplary positions including fractional positions which are allowed to form search space positions for motion vector refinement.

More precisely, the allowed integer and fractional positions may be determined based on the distance of the search point from the point associated to the initial non-refined motion vector. Specifically, search positions are allowed, which are at a distance P in the x direction from the initial non refined motion vector and at a distance R in the y direction from the initial non refined motion vector. Specifically, the memory access window is defined with respect to the point in the reference picture pointed by the initial non-refined motion vector. This is exemplified in FIG. 15, where the center point of the memory access window is a half-pel point between two integer points along the horizontal axis. In the figure the memory access window is defined as extensions in the x-direction (N) and in the y-direction (M), where N and M are integer numbers at least one of which is non-zero. According to a particular implementation a sub-window, i.e. sub-window for search points (or search window), is defined within the memory access window, defined as extensions in the x-direction (P) and In the y-direction (R), which include all the integer pel and fractional pel search points that are allowed to be searched by template matching. In FIG. 15, the numbers P and R are equal to 1 for illustration purposes. Accordingly if the distance of a search point to the center point is greater than P or R, in the x- and y-direction respectively, the search point is not included in the memory access window. In this specific example, since fractional search points require access to additional samples, the memory access window defined by N and M encapsulates or includes the secondary window. P and R can be real numbers describing the distance in units of distance between 2 integer sample points in horizontal and vertical direction. As an example if P and R are defined as P=1.5 and R=1.5, then a search point (integer or fractional) that is at a distance 1.5 in x-direction to the initial center point is allowed to be searched by motion vector refinement process. Moreover in the FIG. 15, the extensions in the left-right directions and top-bottom directions are defined to be equal, P and R respectively, which in general might be unequal. In general all of the 4 extensions to the left, top, right and bottom can be defined independently.

Figure 16:
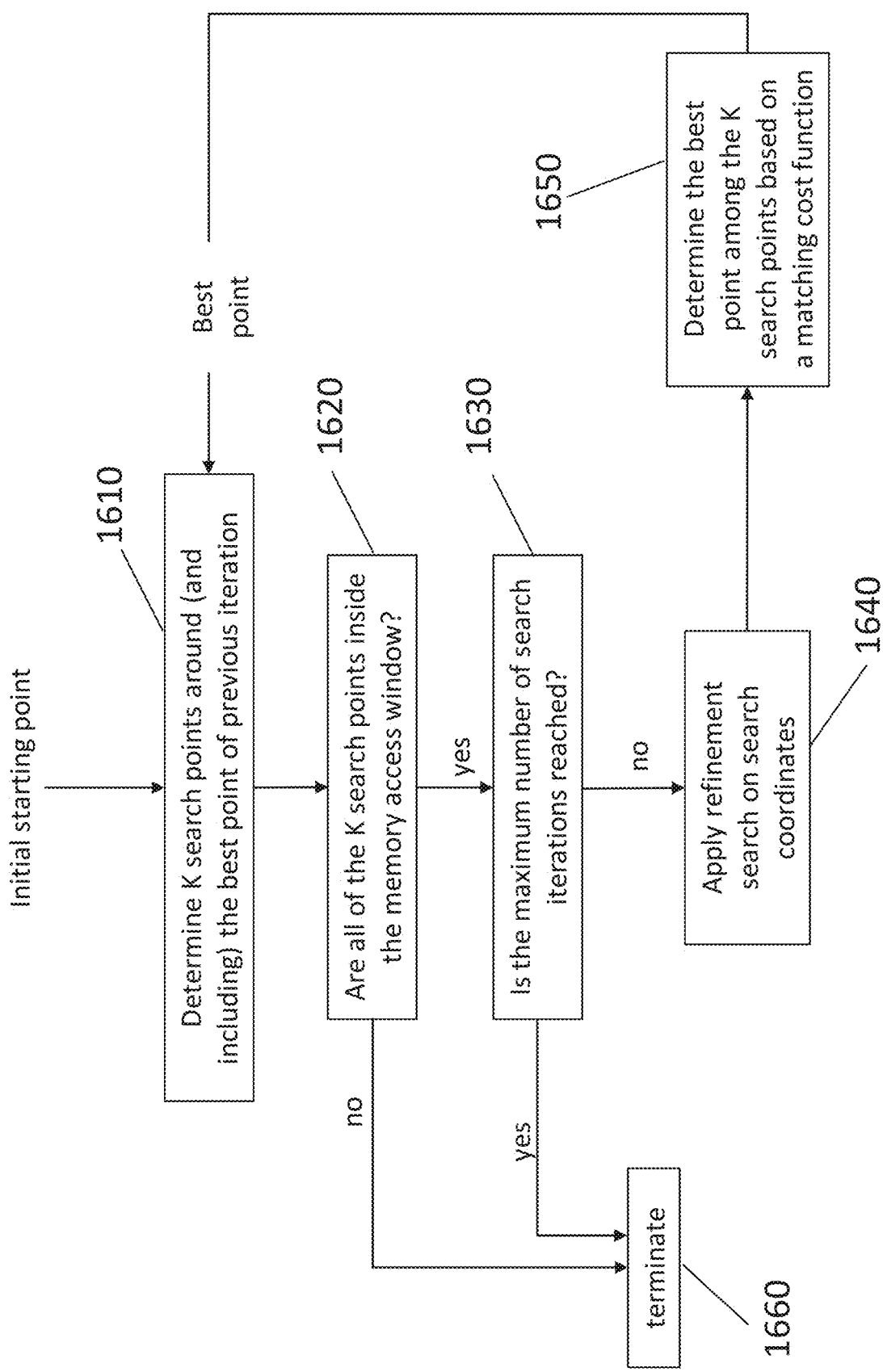
FIG. 16 is a flow diagram illustrating an iterative refinement process in a memory access window.

FIG. 16 describes a possible implementation of an iterative refinement process in a memory access window. According to FIG. 16, the refinement search is applied in an iterative manner, meaning that only up to K search points are searched at each iteration. Firstly K search points are determined around the initial starting point or around the best search point that is selected as a result of the previous iteration (1610). Secondly if all of the K search points are inside the memory access window (1620), the refinement search operation is applied to the K search points. However if any one of the K points are outside of the memory access window, then the search iterations are terminated. Thirdly the condition of maximum number of search iterations are checked (1630) and iterations are terminated if the current iteration exceeds the maximum allowed number of search iterations. Finally the refinement search is applied to K search points (1640) and the best point among the K search points is selected according to a matching cost function (1650). Application of 1640 and 1650 increases the iteration number by 1. After 1650 the process is repeated using the best point which is the output of 1650 as input to 1610. According to FIG. 16, the number K which determines the number of search points that are searched during one iteration defines the maximum number of search points for each iteration. The number K and the pattern of the points that are searched for each iteration might be different, depending on the search strategy that is used. For example according to an example search strategy K=5 search points (center, left, right, below and above) might be searched in the first iteration whereas K=3 points (center, below-right, below-left) might be searched in the second iteration. The number K is a number that is smaller than the total number of search points within the memory access window.

According to the particular implementation described by FIG. 16, if a single search point among the K search points of an iteration is outside of the memory access window, the search iterations are terminated. There might be other points in K search points that are inside the memory access window, but since the iterations are terminated, those points inside the memory access window are also not searched. The purpose of the particular implementation is to reduce the number of search iterations and at the same time guarantee that the search points that fall outside of the memory access window are not searched.

According to 1620, checking whether a search point is inside the memory access window can be performed by checking the distance of the search point to the initial starting point. Therefore if the x-component of the distance is greater than N or if the y-component of the distance is greater than M, the search point is determined to be outside of the memory access window. In general N and M are integer numbers, at least one of which is greater than 0.

The refinement of the initial motion vector may be determined by template matching with said template in a search space which is iteratively extended in a direction given by one of more best matching positions of the search space in a most recent iteration, wherein the iteration is ended when at least one sample within the search space of the most recent iteration is outside the search sub-window.

Figure 17:
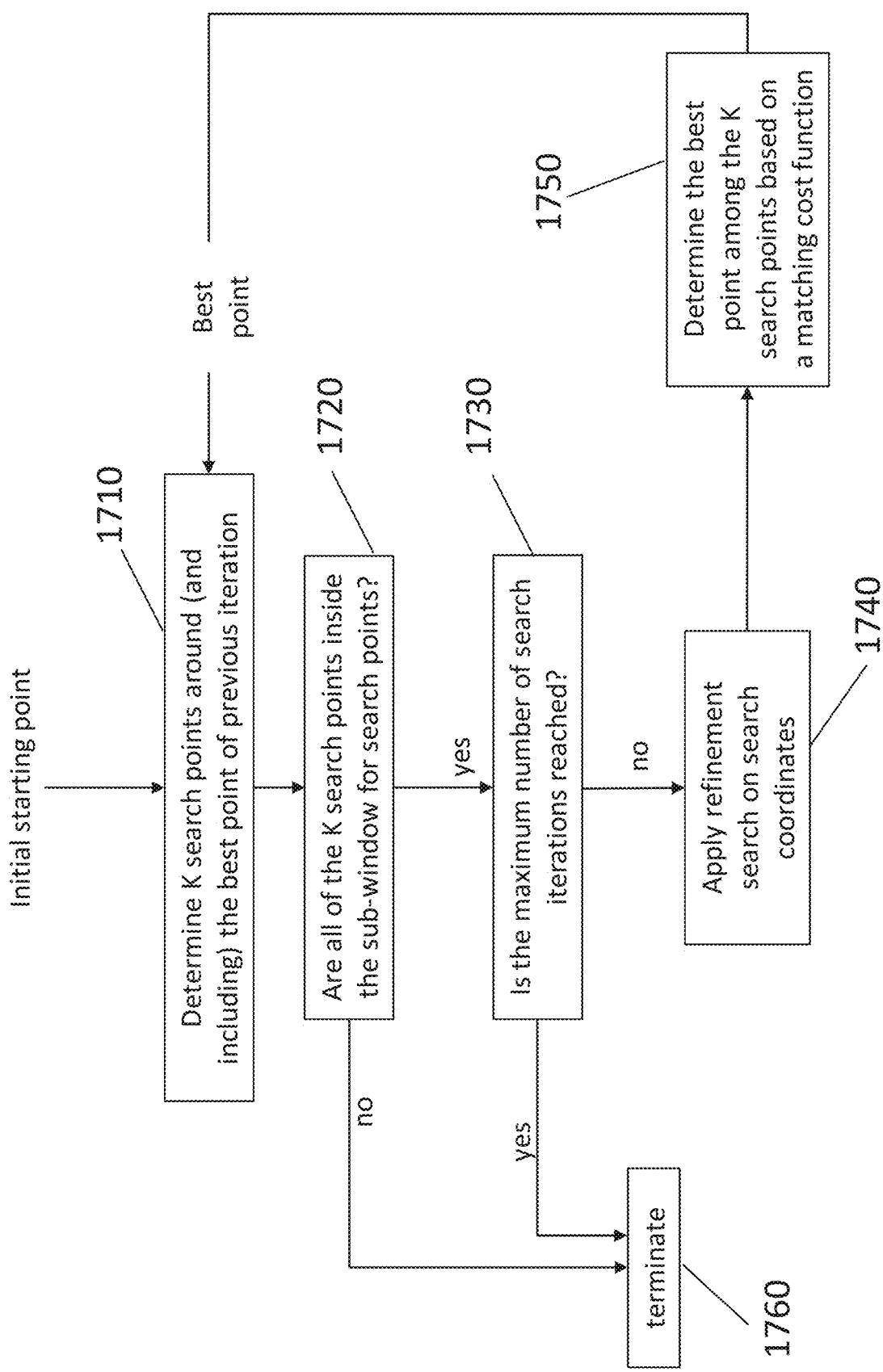
FIG. 17 is a flow diagram illustrating an iterative refinement process in a search sub-window.

FIG. 17 is a flow chart describing a possible iteration scheme applicable to the search sub-window as described in FIG. 15. The flow chart of FIG. 17 is the same as the flow chart described in FIG. 16 except for step 1720. According to step 1720 of FIG. 17, the decision to perform refinement search on the K search points is decided by checking whether all of the K points are inside the sub-window for search points. In other words, as described in FIG. 15, if the distance of any one of the K search points to the center point pointed by initial non-refined motion vector is greater than P or R, then the condition described in 1720 evaluates as false and iterations are terminated.

The motion vector determination with memory window limitation as described above can be implemented as a part of encoding and/or decoding of a video signal (motion picture). However, the motion vector determination may also be used for other purposes in image processing such as movement detection, movement analysis, or the like without limitation to be employed for encoding/decoding.

The motion vector determination may be implemented as an apparatus. Such apparatus may be a combination of a software and hardware. For example, the motion vector determination may be performed by a chip such as a general purpose processor, or a digital signal processor (DSP), or a field programmable gate array (FPGA), or the like. However, the present disclosure is not limited to implementation on a programmable hardware. It may be implemented on an application-specific integrated circuit (ASIC) or by a combination of the above mentioned hardware components.

The motion vector determination may also be implemented by program instructions stored on a computer readable medium. The program, when executed, causes the computer to perform the steps of the above described methods. The computer readable medium can be any medium on which the program is stored such as a DVD, CD, USB (flash) drive, hard disc, server storage available via a network, etc.

The encoder and/or decoder may be implemented in various devices including a TV set, set top box, PC, tablet, smartphone, or the like, i.e. any recording, coding, transcoding, decoding or playback device. It may be a software or an app implementing the method steps and stored/run on a processor included in an electronic device as those mentioned above.

Summarizing, the present disclosure relates to motion vector refinement. As a first step, an initial motion vector and a template for the prediction block are obtained. Then, the refinement of the initial motion vector is determined by template matching with said template in a search space. The search space is located on a position given by the initial motion vector and includes one or more fractional sample positions, wherein each of the fractional sample positions belonging to the search space is obtained by interpolation filtering with a filter of a predefined tap-size assessing integer samples only within a window, said window being formed by integer samples accessible for the template matching in said search space.

What is claimed is:

1. A method for storing a bitstream of video data, the method comprising:
   receiving the bitstream of video data, wherein the bitstream of video data is generated by:
      splitting a video image to obtain a block;
      obtaining an initial motion vector;
      determining a refinement of the initial motion vector by bilateral matching in a search space, wherein the search space is located on a position given by the initial motion vector and includes one or more fractional sample positions, and wherein each of the one or more fractional sample positions belonging to the search space is obtained by interpolation filtering with an interpolation filter of a predefined tap-size assessing integer samples only within a window, the window being formed by integer samples accessible for the bilateral matching in the search space; and
      generating the bitstream of video data comprising the block encoded based on the refinement, wherein the window is defined around a position pointed by the initial motion vector, wherein the window is larger than the block, and wherein the search space is a rectangular sub-window of the window; and
   storing the bitstream of video data.

2. The method according to claim 1, wherein the window is defined as an extension on at least one of:
   left and right of the block; or
   top and bottom of the block.

3. The method according to claim 1, wherein the window identifies a number of samples to be accessed for determining the refinement of the initial motion vector.

4. The method according to claim 1, wherein the window is defined as N integer sample columns and M integer sample rows relative to the initial motion vector, wherein at least one of N or M is a non-zero integer value.

5. The method according to claim 1,
   wherein the refinement of the initial motion vector is determined by the bilateral matching in the search space which is iteratively extended in a direction given by one of more best matching positions of the search space in a most recent iteration; and
   wherein the window is defined by a predefined maximum number of the iterations.

6. The method according to claim 1, wherein the integer samples accessed for interpolation filtering of each fractional sample in the sub-window are located within the window for the interpolation filter with the predefined tap-size.

7. The method according to claim 6, wherein the interpolation filter is a one-dimensional filter assessing K either horizontal or vertical integer samples based on the fractional position being located on a respective horizontal or vertical line of integer samples.

8. The method according to claim 1, wherein the refinement of the initial motion vector is determined by bilateral matching in the rectangular search sub-window such that the integer samples accessed for interpolation filtering of each fractional sample in the search sub-window are located within the window for the interpolation filter with the predefined tap-size.

9. The method according to claim 8,
   wherein the refinement of the initial motion vector is determined by the bilateral matching in the search space which is iteratively extended in a direction given by one or more best matching positions of the search space in a most recent iteration; and
   wherein iterating is ended based on at least one sample within the search space of a most recent iteration being outside the search sub-window.

10. A method for transmitting a bitstream of video data, the method comprising:
    storing the bitstream of video data, wherein the bitstream of video data is generated by:
       splitting a video image to obtain a block;
       obtaining an initial motion vector;
       determining a refinement of the initial motion vector by bilateral matching in a search space, wherein the search space is located on a position given by the initial motion vector and includes one or more fractional sample positions, and wherein each of the one or more fractional sample positions belonging to the search space is obtained by interpolation filtering with an interpolation filter of a predefined tap-size assessing integer samples only within a window, the window being formed by integer samples accessible for the bilateral matching in the search space; and
       generating the bitstream of video data comprising the block encoded based on the refinement, wherein the window is defined around a position pointed by the initial motion vector, wherein the window is larger than the block, and wherein the search space is a rectangular sub-window of the window; and
    transmitting the bitstream of video data.

11. The method according to claim 10, wherein the window is defined as an extension on at least one of:

left and right of the block; or top and bottom of the block.

12. The method according to claim 10, wherein the window identifies a number of samples to be accessed for determining the refinement of the initial motion vector.

13. The method according to claim 10, wherein the window is defined as N integer sample columns and M integer sample rows relative to the initial motion vector, wherein at least one of N or M is a non-zero integer value.

14. The method according to claim 10, wherein the refinement of the initial motion vector is determined by the bilateral matching in the search space which is iteratively extended in a direction given by one of more best matching positions of the search space in a most recent iteration; and wherein the window is defined by a predefined maximum number of the iterations.

15. The method according to claim 10, wherein the integer samples accessed for interpolation filtering of each fractional sample in the sub-window are located within the window for the interpolation filter with the predefined tap-size.

16. The method according to claim 15, wherein the interpolation filter is a one-dimensional filter assessing K either horizontal or vertical integer samples based on the fractional position being located on a respective horizontal or vertical line of integer samples.

17. The method according to claim 10, wherein the refinement of the initial motion vector is determined by bilateral matching in the rectangular search sub-window such that the integer samples accessed for interpolation filtering of each fractional sample in the search sub-window are located within the window for the interpolation filter with the predefined tap-size.

18. The method according to claim 17, wherein the refinement of the initial motion vector is determined by the bilateral matching in the search space which is iteratively extended in a direction given by one of more best matching positions of the search space in a most recent iteration; and wherein iterating is ended based on at least one sample within the search space of a most recent iteration being outside the search sub-window.

\* \* \* \* \*